United States Patent
Dill et al.

(10) Patent No.: US 12,546,355 B2
(45) Date of Patent: *Feb. 10, 2026

(54) POST-TO-BEAM FASTENER

(71) Applicant: Illinois Tool Works Inc., Glenview, IL (US)

(72) Inventors: Michael C. Dill, Elk Grove Village, IL (US); Daniel J. Stemper, Berwyn, PA (US); Brent A. Studenroth, Glenview, IL (US); Anthony M. Versino, Buffalo Grove, IL (US)

(73) Assignee: Illinois Tool Works Inc., Glenview, IL (US)

( * ) Notice: Subject to any disclaimer, the term of this patent is extended or adjusted under 35 U.S.C. 154(b) by 156 days.

This patent is subject to a terminal disclaimer.

(21) Appl. No.: 18/315,299

(22) Filed: May 10, 2023

(65) Prior Publication Data

US 2023/0279890 A1  Sep. 7, 2023

Related U.S. Application Data

(63) Continuation of application No. 16/580,465, filed on Sep. 24, 2019, now Pat. No. 11,692,578.

(60) Provisional application No. 62/834,856, filed on Apr. 16, 2019, provisional application No. 62/737,046, filed on Sep. 26, 2018.

(51) Int. Cl.
*F16B 25/10* (2006.01)
*E04B 1/00* (2006.01)
*F16B 23/00* (2006.01)

(52) U.S. Cl.
CPC .......... *F16B 23/0007* (2013.01); *E04B 1/003* (2013.01)

(58) Field of Classification Search
CPC .................................................... F16B 25/103
USPC ................. 411/387.1, 387.4–387.8
See application file for complete search history.

(56) References Cited

U.S. PATENT DOCUMENTS

| | | |
|---|---|---|
| RE26 E | 9/1840 | Williamson |
| 781,652 A | 2/1905 | Hiatt |
| 808,245 A | 12/1905 | Lund |
| 996,612 A | 7/1911 | Caldwell |
| 1,764,053 A | 6/1930 | Reed |
| 2,034,494 A | 3/1936 | Stoll |
| 2,035,298 A | 3/1936 | Caldwell |

(Continued)

FOREIGN PATENT DOCUMENTS

| | | |
|---|---|---|
| AU | 739428 | 10/2001 |
| AU | 2005204302 | 4/2006 |

(Continued)

OTHER PUBLICATIONS

European Office Action from European Application No. 19783892. 3, dated May 3, 2023 (5 pages).

(Continued)

*Primary Examiner* — Flemming Saether
(74) *Attorney, Agent, or Firm* — Neal, Gerber & Eisenberg LLP

(57) ABSTRACT

Various embodiments provide a post-to-beam fastener including a head, a tip, and a threaded shank connected to the head at a first end and the tip and a second end. In various embodiments, threaded shank includes a longitudinal axis extending from the head to the tip, and the tip includes a recess operable to removably receive a drill bit to the fastener.

8 Claims, 21 Drawing Sheets

(56) References Cited

U.S. PATENT DOCUMENTS

| | | |
|---|---|---|
| 2,914,983 A | 12/1959 | Kopf et al. |
| 2,993,950 A | 7/1961 | Forman |
| 3,316,796 A | 5/1967 | Young |
| 3,389,734 A | 6/1968 | Gutshall |
| 3,540,509 A | 11/1970 | Gutshall |
| 3,937,119 A | 2/1976 | Ernst |
| 3,982,464 A | 9/1976 | Sygnator |
| 4,022,099 A * | 5/1977 | Ballantyne .......... F16B 25/0021 411/383 |
| 4,026,186 A | 5/1977 | Williams, Jr. et al. |
| 4,173,918 A | 11/1979 | Piersall |
| 4,223,711 A | 9/1980 | Tabor |
| 4,310,272 A | 1/1982 | Rich et al. |
| 4,518,294 A | 5/1985 | Barth |
| 4,652,193 A | 3/1987 | Hibbs |
| 4,682,917 A | 7/1987 | Williams et al. |
| 4,705,441 A | 11/1987 | Arnold |
| 4,749,319 A | 6/1988 | Sygnator |
| 4,764,066 A | 8/1988 | Terrell et al. |
| 4,812,095 A | 3/1989 | Piacenti et al. |
| 4,883,395 A | 11/1989 | Klaric |
| 4,900,207 A | 2/1990 | McGovern |
| 4,900,208 A | 2/1990 | Kaiser |
| 4,911,593 A | 3/1990 | Kephart |
| 4,936,395 A | 6/1990 | Enderle |
| 5,046,905 A | 9/1991 | Piacenti et al. |
| 5,183,357 A | 2/1993 | Palm |
| 5,213,459 A | 5/1993 | Palm |
| 5,246,323 A | 9/1993 | Vernet et al. |
| 5,403,137 A * | 4/1995 | Grun .................. B25B 13/48 411/29 |
| 5,593,253 A | 1/1997 | Pozzo |
| 5,746,096 A * | 5/1998 | Lukes ................ F16B 25/0084 81/180.1 |
| 5,749,689 A * | 5/1998 | Konig ................ F16B 25/0094 411/29 |
| 5,816,759 A | 10/1998 | Ernst et al. |
| 5,820,319 A | 10/1998 | Hull et al. |
| 5,820,321 A | 10/1998 | Gruber |
| 5,863,167 A | 1/1999 | Kaneko |
| 5,885,041 A | 3/1999 | Giannuzzi |
| 5,899,252 A | 5/1999 | Pozzo |
| 6,048,141 A | 4/2000 | Freeman |
| 6,065,918 A | 5/2000 | Adams |
| RE36,741 E | 6/2000 | Walther |
| 6,164,884 A | 12/2000 | Mayr |
| 6,270,303 B1 | 8/2001 | Gauthier et al. |
| 6,325,580 B1 | 12/2001 | Diamond |
| 6,354,347 B1 | 3/2002 | Brewer |
| 6,382,892 B1 | 5/2002 | Hempfling |
| 6,558,097 B2 | 5/2003 | Mallet et al. |
| 6,712,544 B2 | 3/2004 | Krüger et al. |
| 6,827,535 B2 | 12/2004 | Fuchs et al. |
| 6,829,871 B1 | 12/2004 | McSherry et al. |
| 6,908,270 B1 * | 6/2005 | Iwata .................. F16B 39/282 411/959 |
| 6,935,821 B2 | 8/2005 | Bodin et al. |
| 6,942,439 B2 | 9/2005 | Rouger |
| 6,976,818 B2 | 12/2005 | Levey |
| 7,131,473 B1 | 11/2006 | Brewer |
| 7,156,600 B2 | 1/2007 | Panasik et al. |
| 7,261,505 B2 | 8/2007 | Ernst et al. |
| 7,357,613 B2 | 4/2008 | Houck et al. |
| 7,588,402 B2 | 9/2009 | Chuang |
| 7,713,010 B2 | 5/2010 | Cheng |
| 7,744,320 B2 | 6/2010 | Kobetsky et al. |
| 7,896,594 B2 | 3/2011 | Nardi et al. |
| 7,901,170 B2 | 3/2011 | Usui |
| 8,113,749 B2 | 2/2012 | Dost et al. |
| 8,137,042 B2 | 3/2012 | Severns |
| 8,322,959 B2 | 12/2012 | Mair |
| 8,322,960 B2 | 12/2012 | Gong et al. |
| 8,348,575 B2 | 1/2013 | Walther |
| 8,376,678 B2 | 2/2013 | Walker |
| 8,419,332 B2 | 4/2013 | Kochheiser |
| 8,444,355 B2 | 5/2013 | Gaudron et al. |
| 8,491,244 B2 | 7/2013 | Kobetsky et al. |
| 8,511,958 B2 | 8/2013 | Chang |
| 8,591,159 B2 | 11/2013 | Walther |
| 8,678,730 B2 | 3/2014 | Gaudron et al. |
| 8,864,430 B2 | 10/2014 | Su |
| 9,086,088 B2 | 7/2015 | Walther |
| 9,255,594 B2 | 2/2016 | Cabrit et al. |
| 9,297,402 B2 | 3/2016 | Hughes |
| 9,512,868 B2 | 12/2016 | Stempniewski et al. |
| 9,523,383 B2 | 12/2016 | Park |
| 9,541,116 B2 | 1/2017 | Cabaj et al. |
| 9,562,558 B2 | 2/2017 | Anasis et al. |
| 9,581,185 B2 | 2/2017 | Anasis et al. |
| 9,856,897 B2 | 1/2018 | Schaeffer |
| 9,970,465 B2 | 5/2018 | Gstach et al. |
| 9,970,467 B2 | 5/2018 | Dijkhuis et al. |
| 10,018,213 B2 | 7/2018 | Gstach et al. |
| 10,190,617 B2 | 1/2019 | Anasis et al. |
| D872,144 S | 1/2020 | Kulig et al. |
| 10,570,943 B2 | 2/2020 | Gong et al. |
| 10,940,545 B2 | 3/2021 | Kulig et al. |
| 11,035,399 B2 | 6/2021 | Truong et al. |
| 2001/0038781 A1 | 11/2001 | Mallet et al. |
| 2003/0026673 A1 | 2/2003 | Filipp |
| 2004/0062616 A1 | 4/2004 | Pozzo |
| 2004/0071524 A1 | 4/2004 | Habermehl |
| 2004/0096288 A1 | 5/2004 | Haug et al. |
| 2004/0223832 A1 | 11/2004 | Aasgaard |
| 2006/0133908 A1 | 6/2006 | Kunz et al. |
| 2006/0165505 A1 | 7/2006 | Aasgaard |
| 2007/0224015 A1 | 9/2007 | Ayrle |
| 2008/0124187 A1 | 5/2008 | Haytayan et al. |
| 2009/0142160 A1 | 6/2009 | Hale |
| 2009/0175701 A1 | 7/2009 | Wu |
| 2010/0111639 A1 | 5/2010 | Gaudron |
| 2010/0158634 A1 | 6/2010 | Walther |
| 2010/0278614 A1 | 11/2010 | Bickford |
| 2011/0014007 A1 | 1/2011 | Gaudron |
| 2011/0044785 A1 | 2/2011 | Chao |
| 2011/0064540 A1 | 3/2011 | Walther |
| 2011/0081217 A1 | 4/2011 | Wissling et al. |
| 2011/0222984 A1 | 9/2011 | Gillis et al. |
| 2012/0128444 A1 | 5/2012 | Podesser et al. |
| 2012/0263553 A1 | 10/2012 | Greenfield |
| 2012/0266560 A1 | 10/2012 | Panasik et al. |
| 2014/0010613 A1 | 1/2014 | Gaudron et al. |
| 2014/0072384 A1 | 3/2014 | Wissling |
| 2014/0075875 A1 | 3/2014 | Dayton et al. |
| 2017/0037646 A1 | 2/2017 | Huang et al. |
| 2017/0120347 A1 | 5/2017 | Lourenco et al. |
| 2017/0167517 A1 | 6/2017 | Wissling |
| 2018/0100533 A1 | 4/2018 | Dill |
| 2018/0135682 A1 | 5/2018 | Gong et al. |
| 2019/0078603 A1 | 3/2019 | Truong et al. |
| 2019/0219084 A1 | 7/2019 | Dill et al. |

FOREIGN PATENT DOCUMENTS

| | | |
|---|---|---|
| AU | 2007237362 | 6/2008 |
| AU | 2008324971 | 10/2014 |
| BE | 661 105 | 7/1965 |
| CA | 2257758 | 7/1999 |
| CA | 236690 | 7/2008 |
| CA | 2366684 | 7/2008 |
| CA | 2616478 A1 | 6/2009 |
| CA | 2 708 419 | 12/2011 |
| CN | 237211 | 4/2000 |
| CN | 201561026 | 8/2010 |
| CN | 101821068 | 5/2013 |
| DE | 33 44 048 | 6/1984 |
| DE | 37 39 371 | 6/1989 |
| DE | 40 03 374 | 5/1991 |
| DE | 296 09 008 | 8/1996 |
| DE | 20 2004 015509 | 12/2004 |
| DE | 202005017976 U1 | 3/2007 |
| DE | 10 210 030 893 | 1/2012 |
| DE | 20 2015 005206 | 9/2015 |

(56) References Cited

FOREIGN PATENT DOCUMENTS

| | | |
|---|---|---|
| EP | 0 307 119 | 3/1989 |
| EP | 1 072 802 | 1/2001 |
| EP | 1221362 | 7/2002 |
| EP | 1221363 | 7/2002 |
| EP | 1 939 466 | 7/2008 |
| EP | 2 339 189 | 6/2011 |
| EP | 2 458 233 | 5/2012 |
| EP | 2 567 107 | 3/2013 |
| EP | 2217417 | 6/2016 |
| EP | 3162480 | 5/2017 |
| EP | 3 225 858 | 10/2017 |
| FR | 1 590 097 | 4/1970 |
| GB | 888 309 | 1/1962 |
| GB | 1 482 624 | 8/1977 |
| GB | 2 254 392 | 10/1992 |
| GB | 2333255 | 7/1999 |
| GB | 2444634 | 6/2008 |
| JP | S597511 | 1/1984 |
| JP | 2000 230520 | 8/2000 |
| RU | 2492971 | 9/2013 |
| WO | WO 97/49929 | 12/1997 |
| WO | WO 2006/039412 | 4/2006 |
| WO | WO 2007/104094 | 9/2007 |
| WO | WO 2008/041836 | 4/2008 |
| WO | WO 2009061636 | 5/2009 |
| WO | WO 2015/022049 | 2/2015 |
| WO | WO 2016/205119 | 12/2016 |
| WO | WO 2017/032423 | 3/2017 |
| WO | WO 2018/093571 | 5/2018 |
| WO | WO 2020082977 | 4/2020 |

OTHER PUBLICATIONS

International Search Report and Written Opinion for International Application No. PCT/US2019/052939, dated Dec. 12, 2019 (16 pages).

Simpson Strong-Tie Titen® 2 Concrete and Masonry Screw, retrieved from the Internet at https://www.strongtie.com/mechanicalanchors_mechanicalanchoringproducts/ttn2_screw/p/titen-2, Sep. 24, 2018 (available before Sep. 24, 2019)(7 pages).

Tapcon ¼ in.×2-¾ in. Hex-Washer-Head Concrete Anchors (75-pack), retrieved from the Internet at https://www.homedepot.com/p/Tapcon-1-4-in-x-2-3-4-in-Hex-Washer-Head-Concrete-Anchors-75-Pack-24330/100098197, on Oct. 31, 2017 (available before Sep. 24, 2019)(12 pages).

* cited by examiner

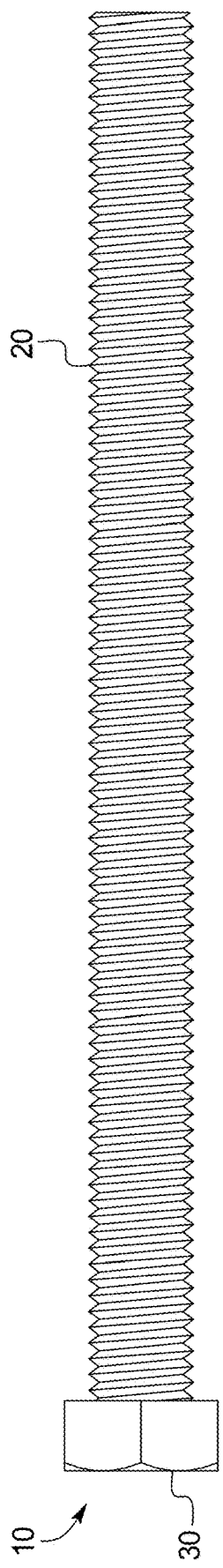
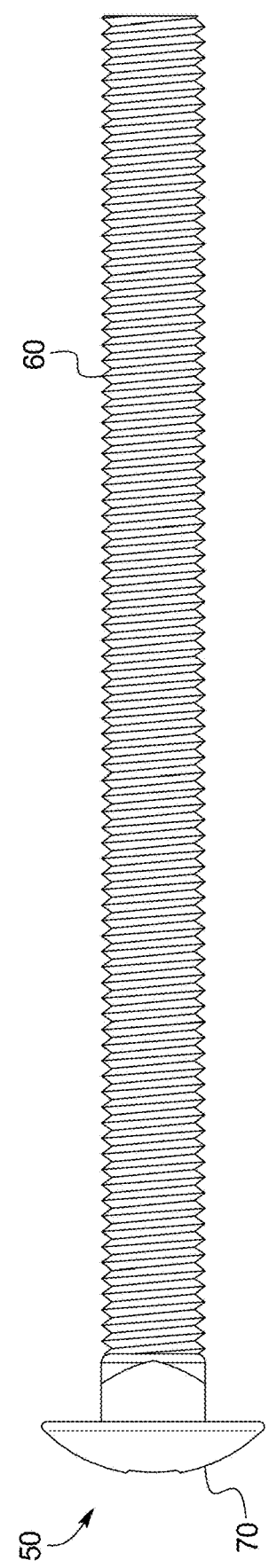
FIG. 1A
(PRIOR ART)
FIG. 1B
(PRIOR ART)

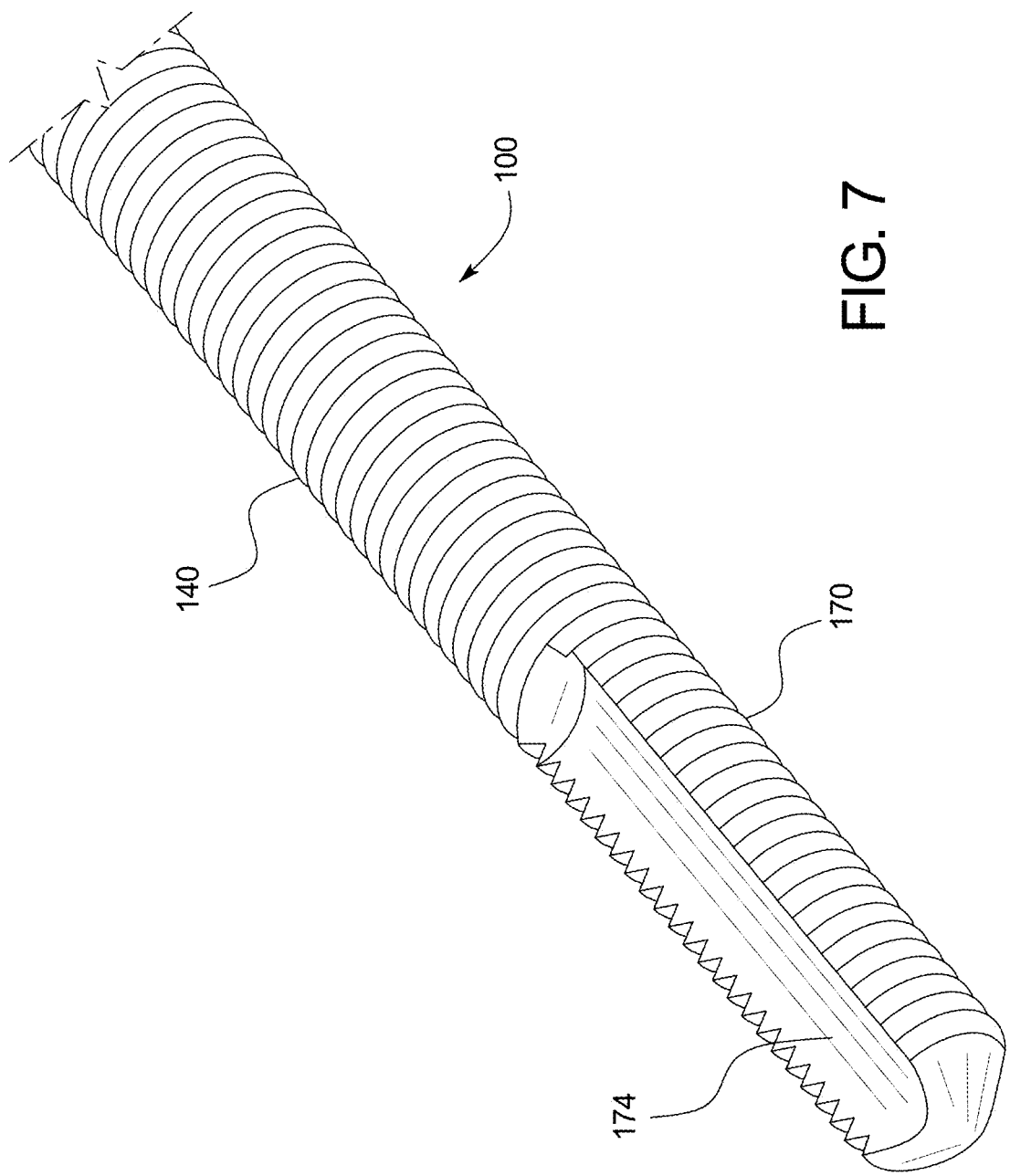

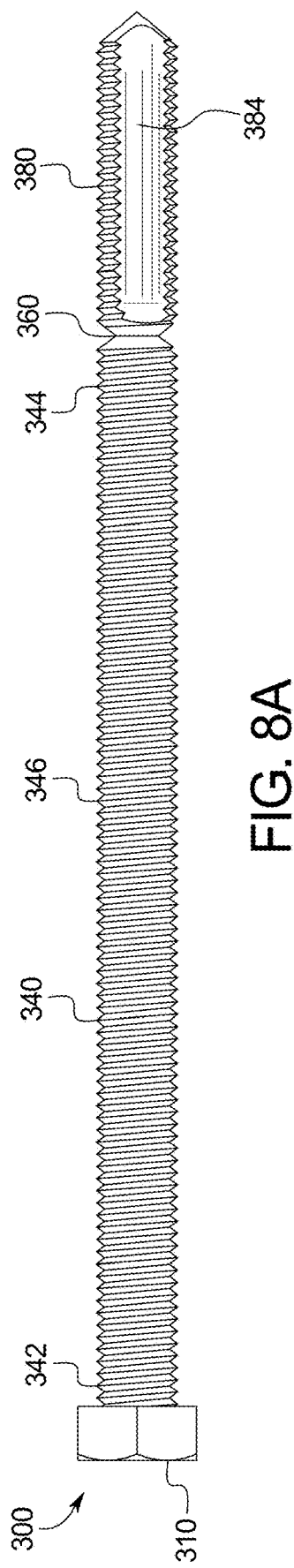
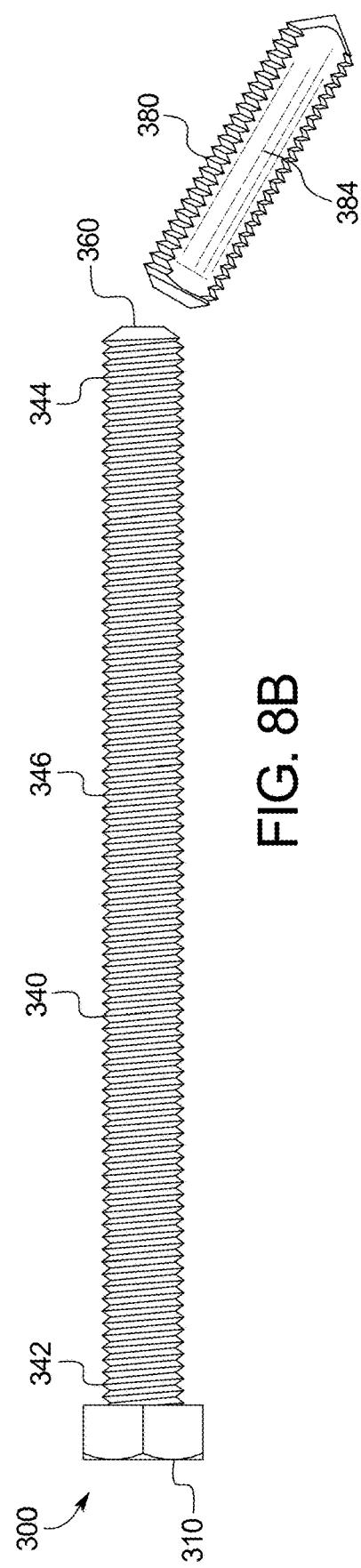
FIG. 8A
FIG. 8B

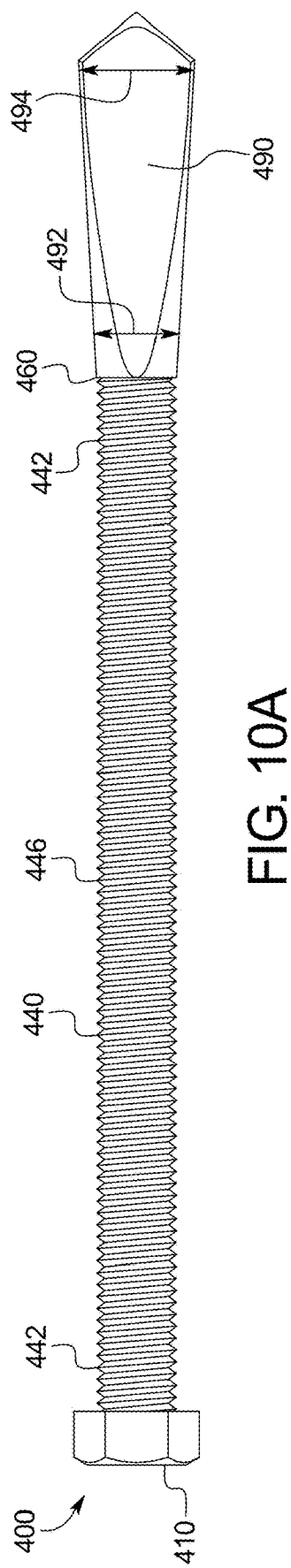
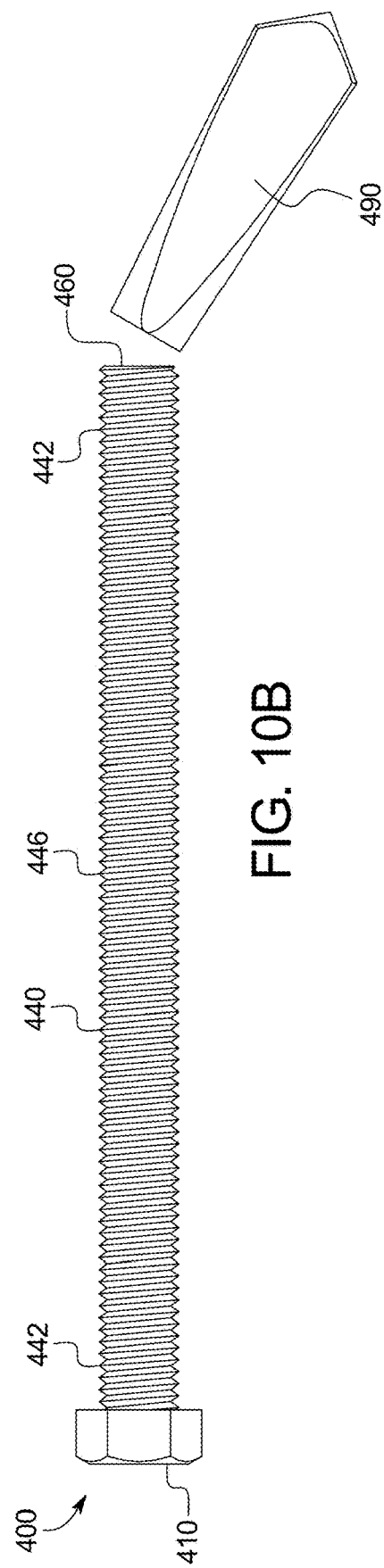
FIG. 10A
FIG. 10B

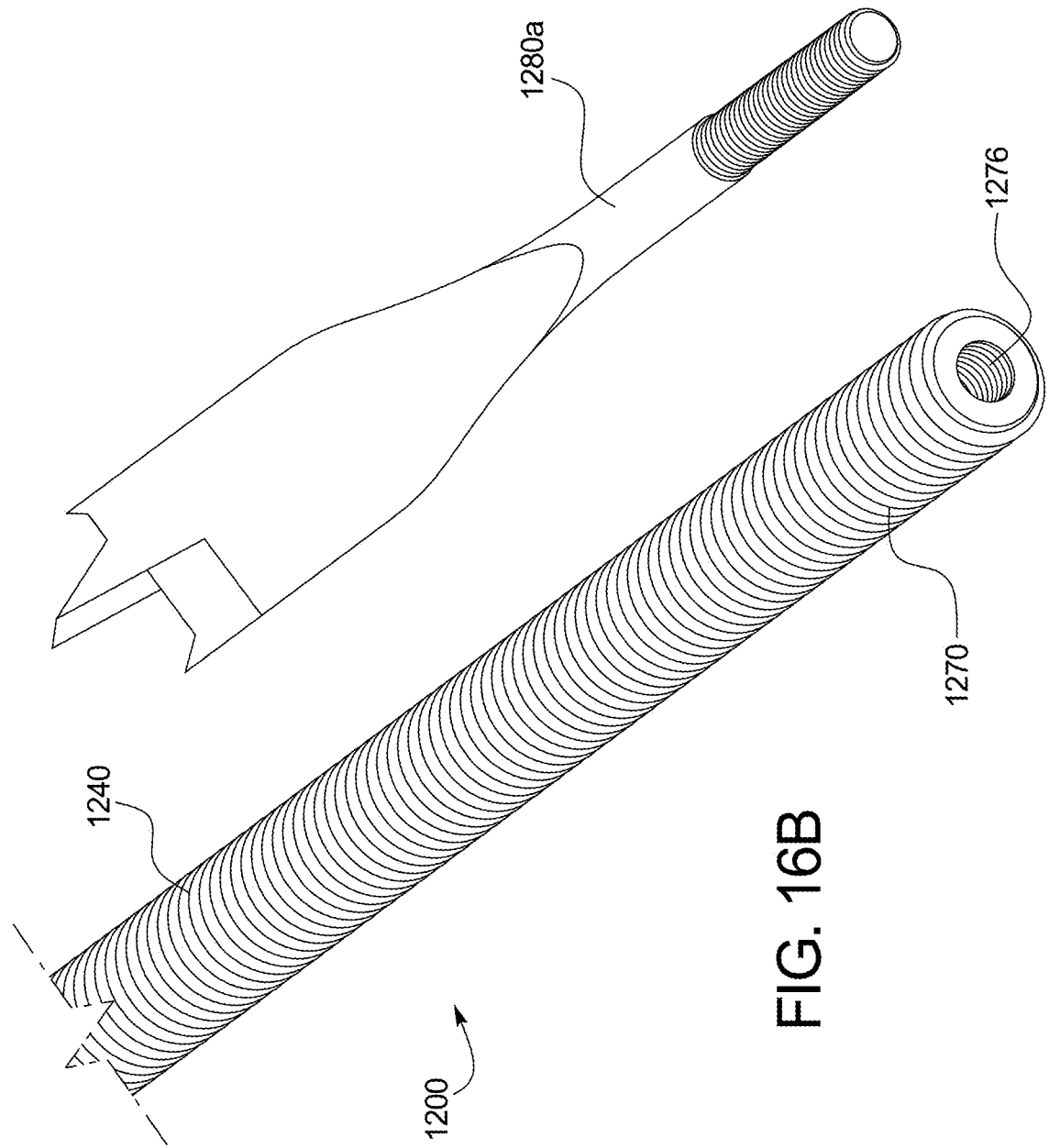

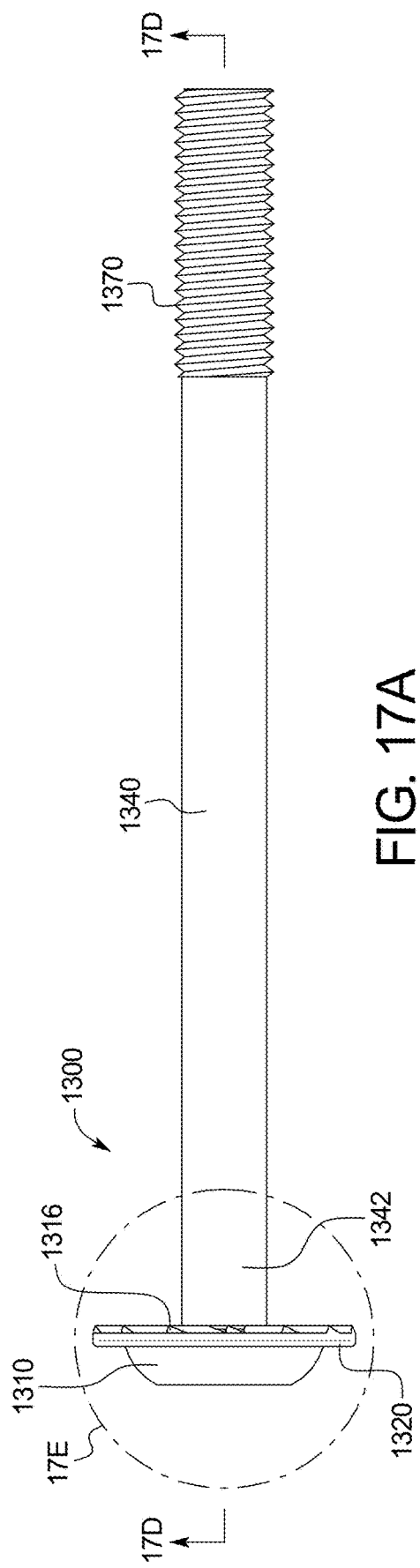
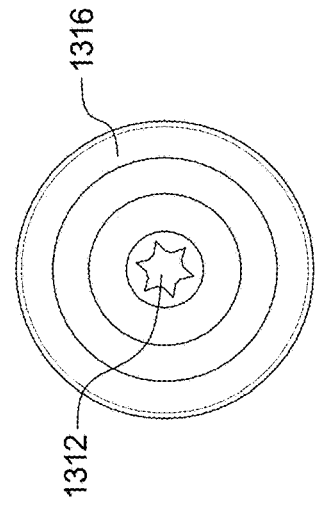
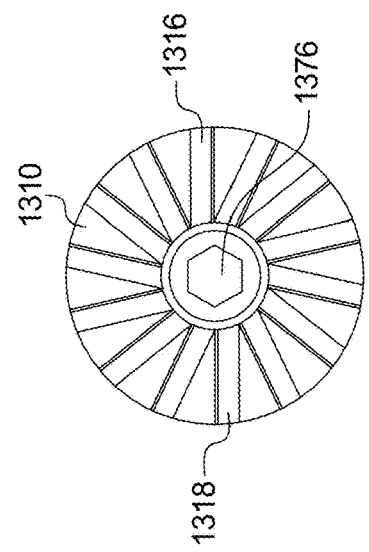
FIG. 17A
FIG. 17C
FIG. 17B

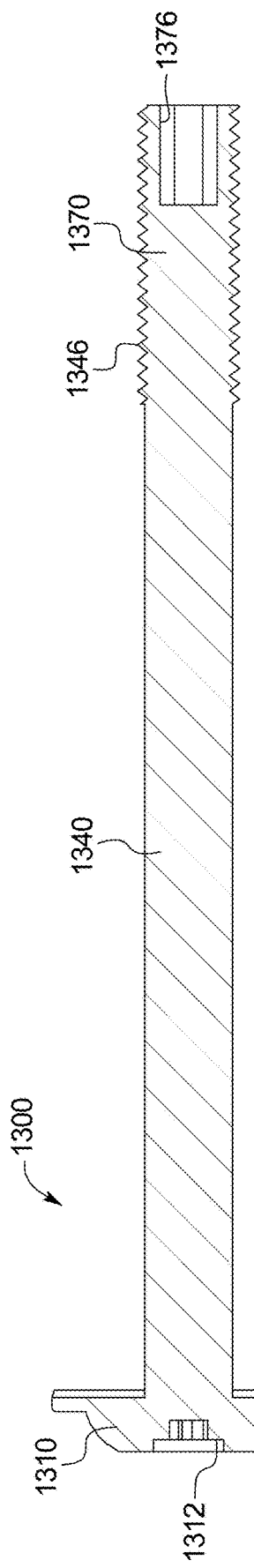
FIG. 17D
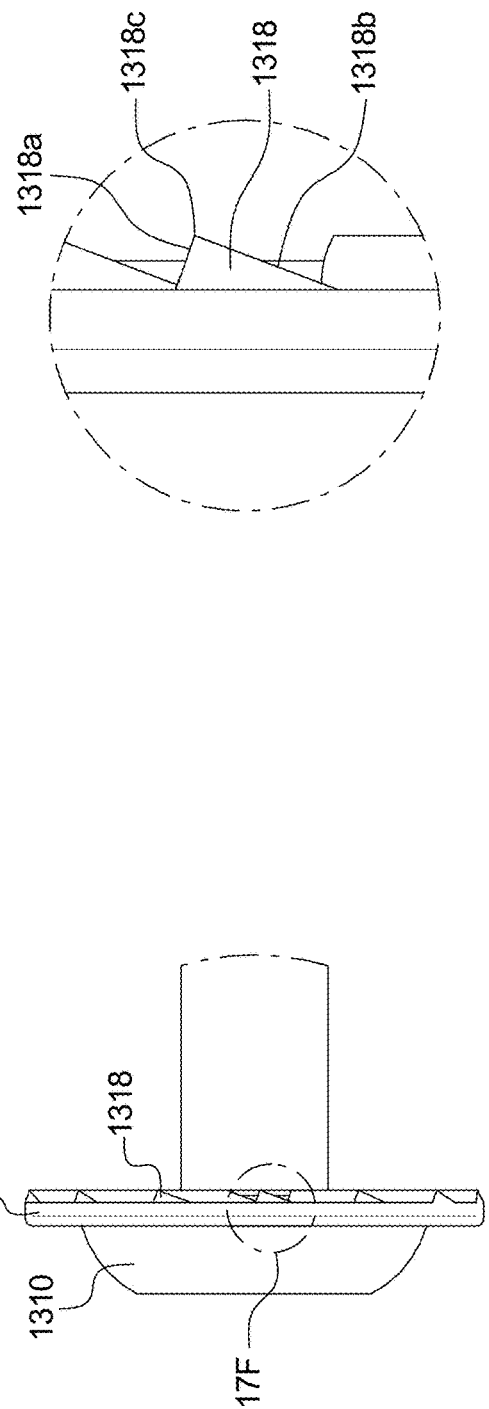
FIG. 17F
FIG. 17E

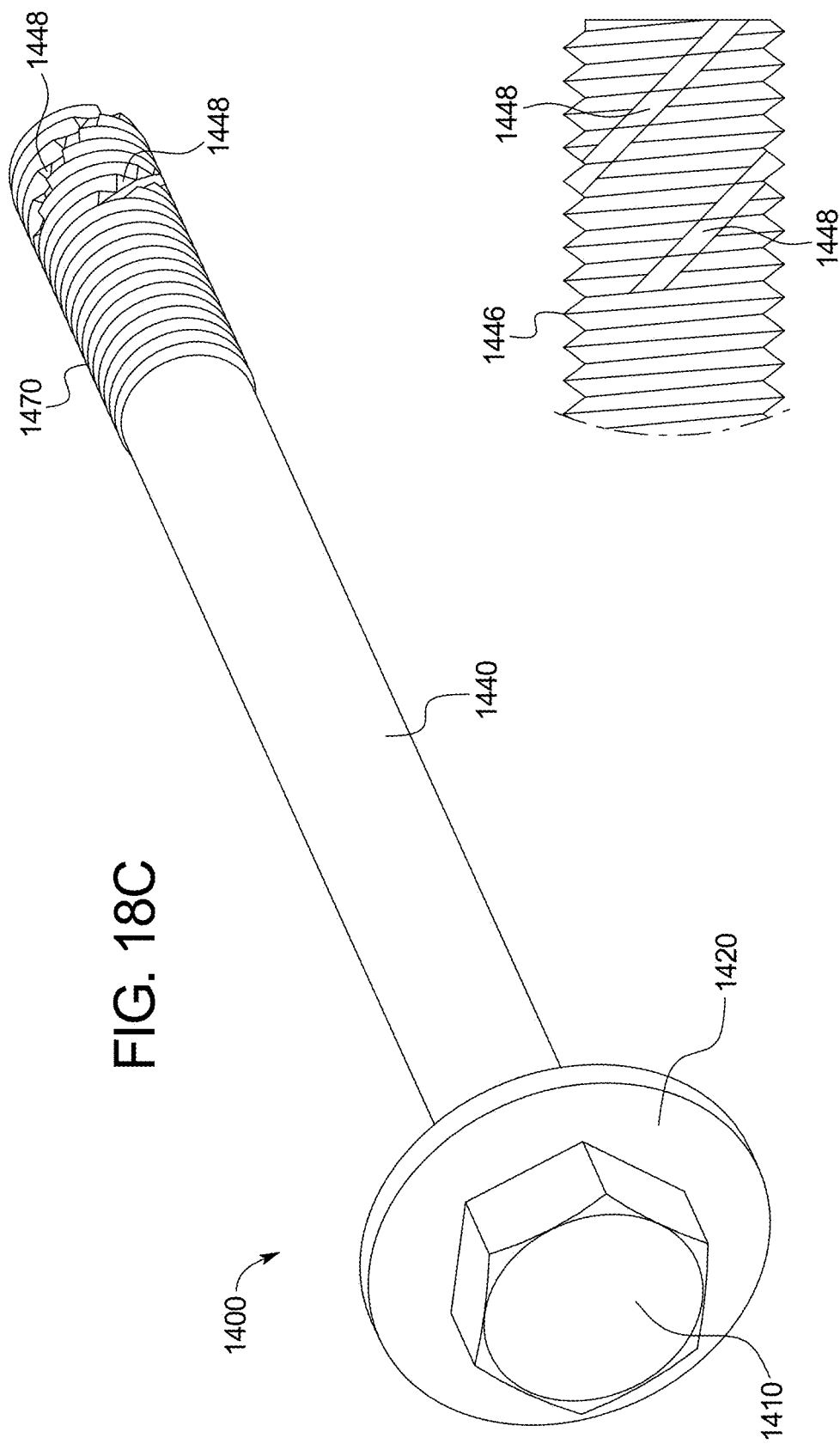

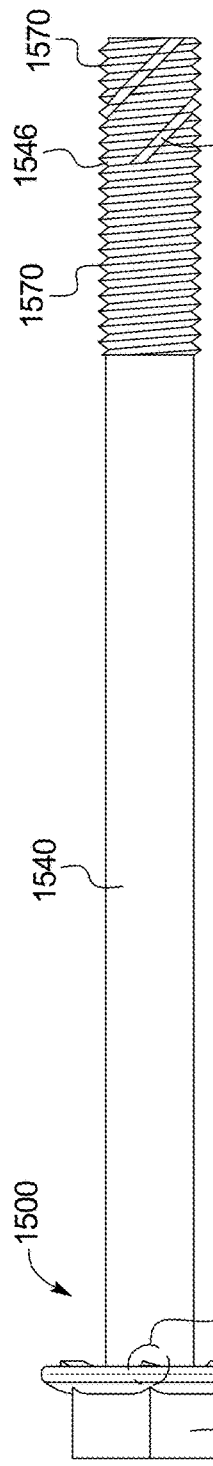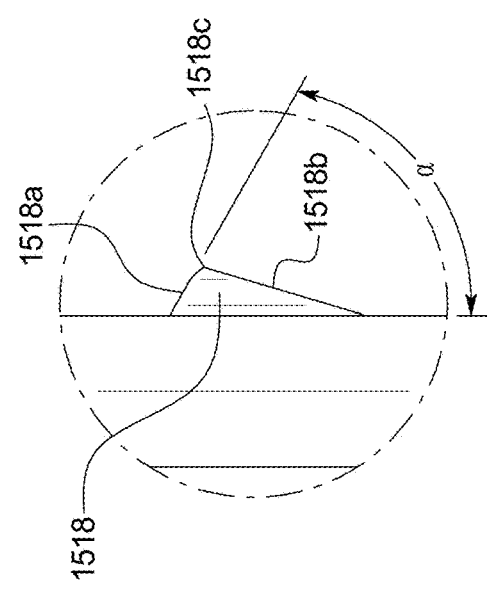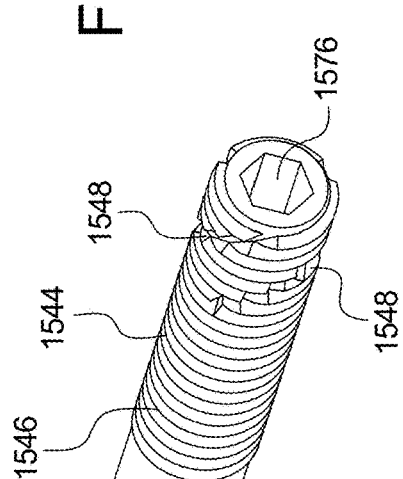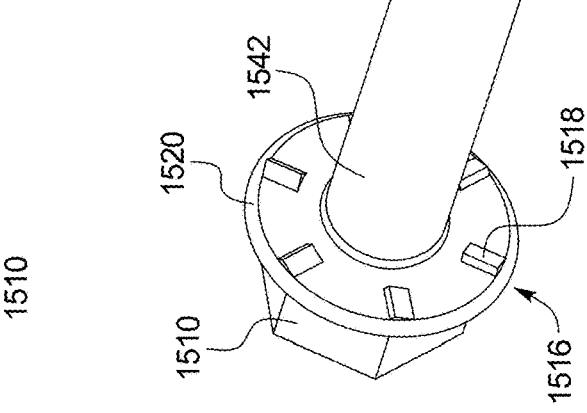
FIG. 19A
FIG. 19C
FIG. 19B

POST-TO-BEAM FASTENER

PRIORITY CLAIM

This application is a continuation of and claims priority to and the benefit of U.S. patent application Ser. No. 16/580,465, filed Sep. 24, 2019, which claims priority to and the benefit of U.S. Provisional Patent Application Ser. No. 62/834,856, filed Apr. 16, 2019, and claims priority to and the benefit of U.S. Provisional Patent Application Ser. No. 62/737,046, filed Sep. 26, 2018, the entire contents of each of which are incorporated herein by reference.

BACKGROUND

Generally, known post-to-beam fastening operations use several separate assemblies for enabling the insertion of a bolt into a wood deck post and/or wood deck beam. More specifically, certain known post-to-beam fastening operations start with a ½ inch (1.27 cms) drill bit inserted into the chuck of a power drill. The power drill and the drill bit from a predrilled hole in the wood and the drill bit is removed from the hole. A ½ inch (1.27 cms) bolt with a washer is hammered into the hole, and a washer and nut are affixed to the opposite end of the bolt. The nut is tightened until the bolt is locked into place. The ½ inch (1.27 cms) diameter bolt can have a carriage head or a hex head. The carriage head bolt includes a square shoulder that, when hammered into the hole in the wood, will lock into place, providing enough torque to facilitate tightening the nut as needed. The hex head bolt enables the user to use a wrench to hold the head of the bolt while another wrench is used to tighten the nut. Both hex head bolts and carriage head bolt such as shown in FIGS. 1A and 1B have been utilized in this manner.

There exists a need for an improved post-to-beam fastener and method of post-to-beam fastening that are faster and more efficient.

BRIEF SUMMARY

Various embodiments of the present disclosure provide an improved post-to-beam fastener and an improved method of post-to-beam fastening that are faster and more efficient. These embodiments solve the above problems in part by providing a fastener that combines the pre-drilling and bolt installation steps of post-to-beam fastening into one step (i.e., a single step).

Various embodiments of the present disclosure provide a fastener including a head and a drill tip operable to drill through wood. A threaded shank connects the head at a first end and the drill tip at a second end. The threaded shank has a longitudinal axis extending from the head to the drill tip. The head includes a retaining feature operable to removably secure the fastener to a drill to enable forward and backward movement along the longitudinal axis of the shank.

Various embodiments of the present disclosure provide a fastener including a head and a tip connected by a threaded shank with a longitudinal axis extending from the head to the tip. The tip includes a recess operable to removably receive and facilitate attachment of a drill bit to the tip end of the fastener.

Various embodiments of the present disclosure provide a method of fastening in which a fastener is attached to a drill by a retaining feature operable to removably secure the fastener to the drill and enable forward and backward movement along a longitudinal axis. The fastener is drilled through a deck post and a deck beam. The fastener is detached from the drill. A nut is installed and tightened on the fastener to press and connect the deck post and deck beam adjacent to each other along the longitudinal axis.

Various embodiments of the present disclosure provide a method of fastening in which a drill bit is removably attached to a fastener in a recess proximate a tip of the fastener. The drill bit and the fastener are drilled through a deck post and a deck beam. The drill bit is detached from the fastener. A nut is installed and tightened on the fastener to press and connect the deck post and deck beam adjacent to each other along the longitudinal axis.

BRIEF DESCRIPTION OF THE SEVERAL VIEWS OF THE DRAWINGS

Figure 2B:
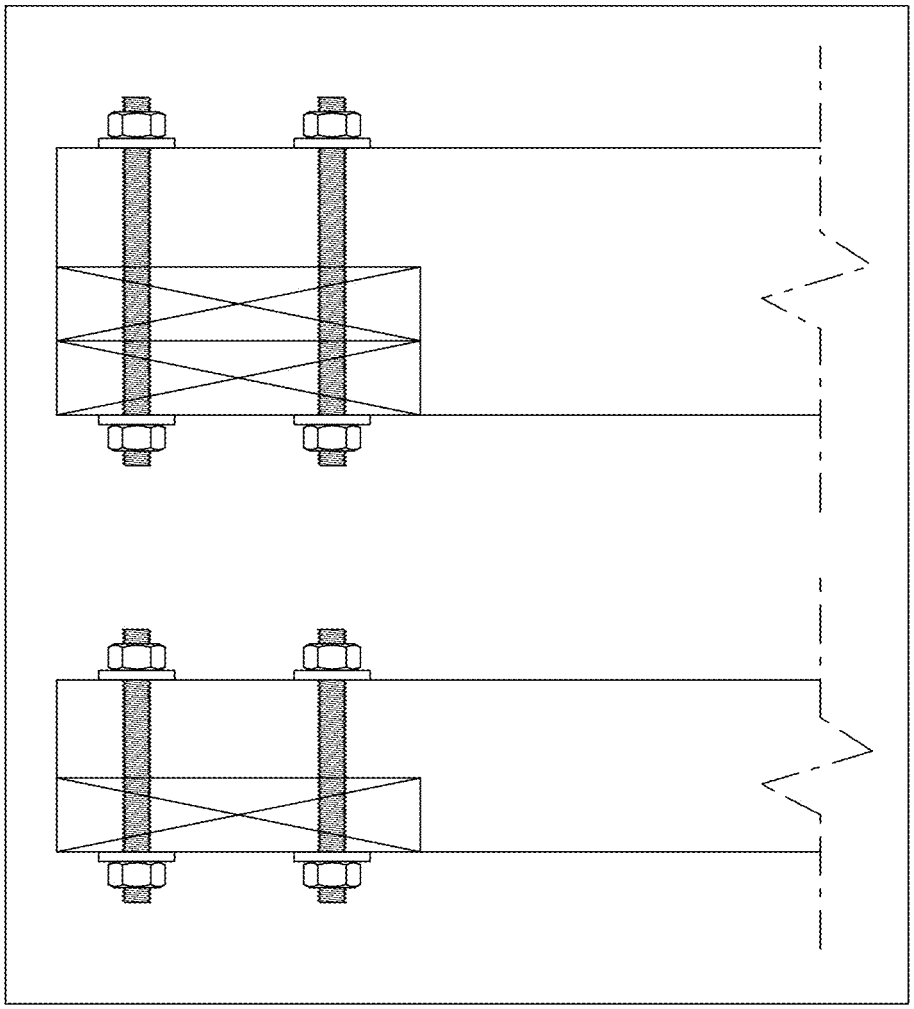
Figure 2A:
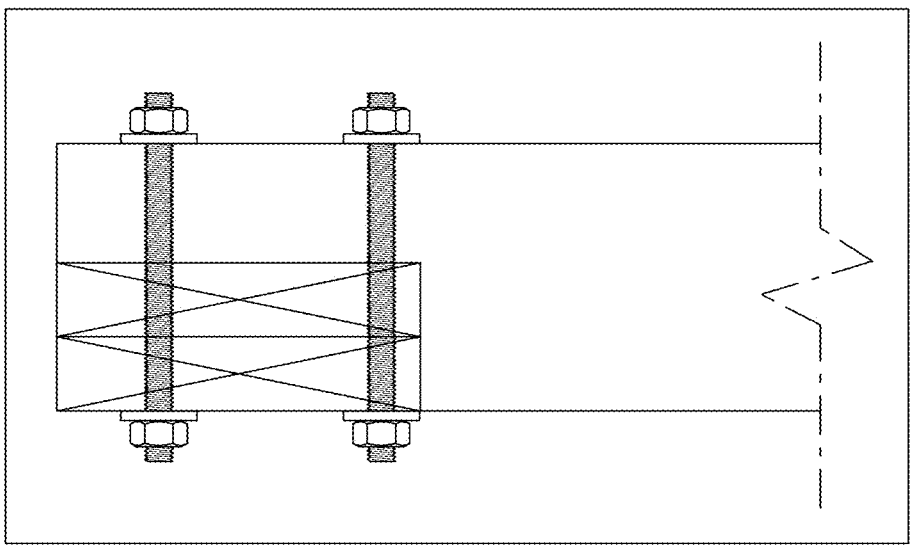
Figure 3:
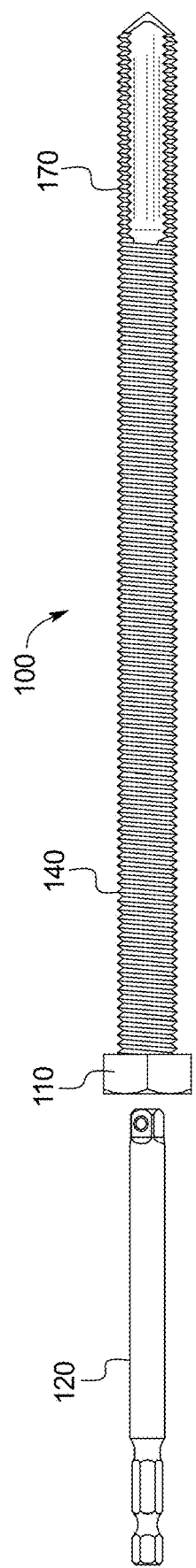
Figure 4:
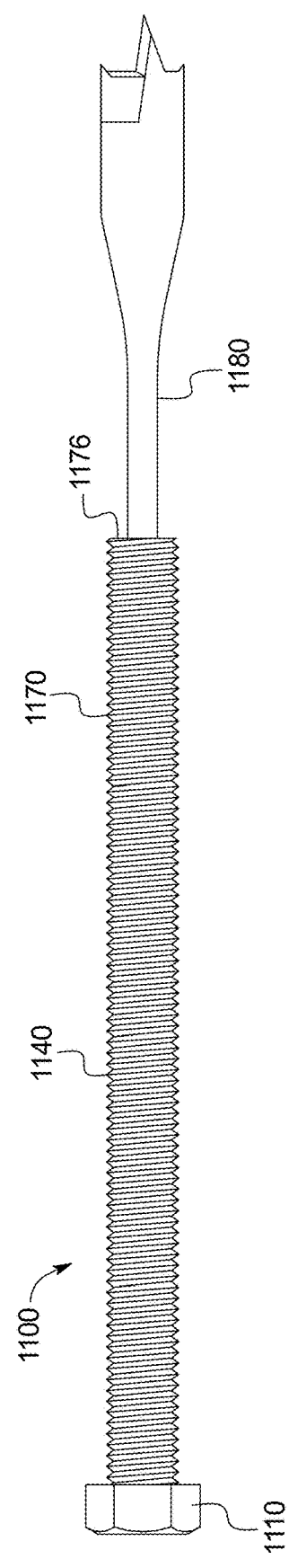
Figure 5:
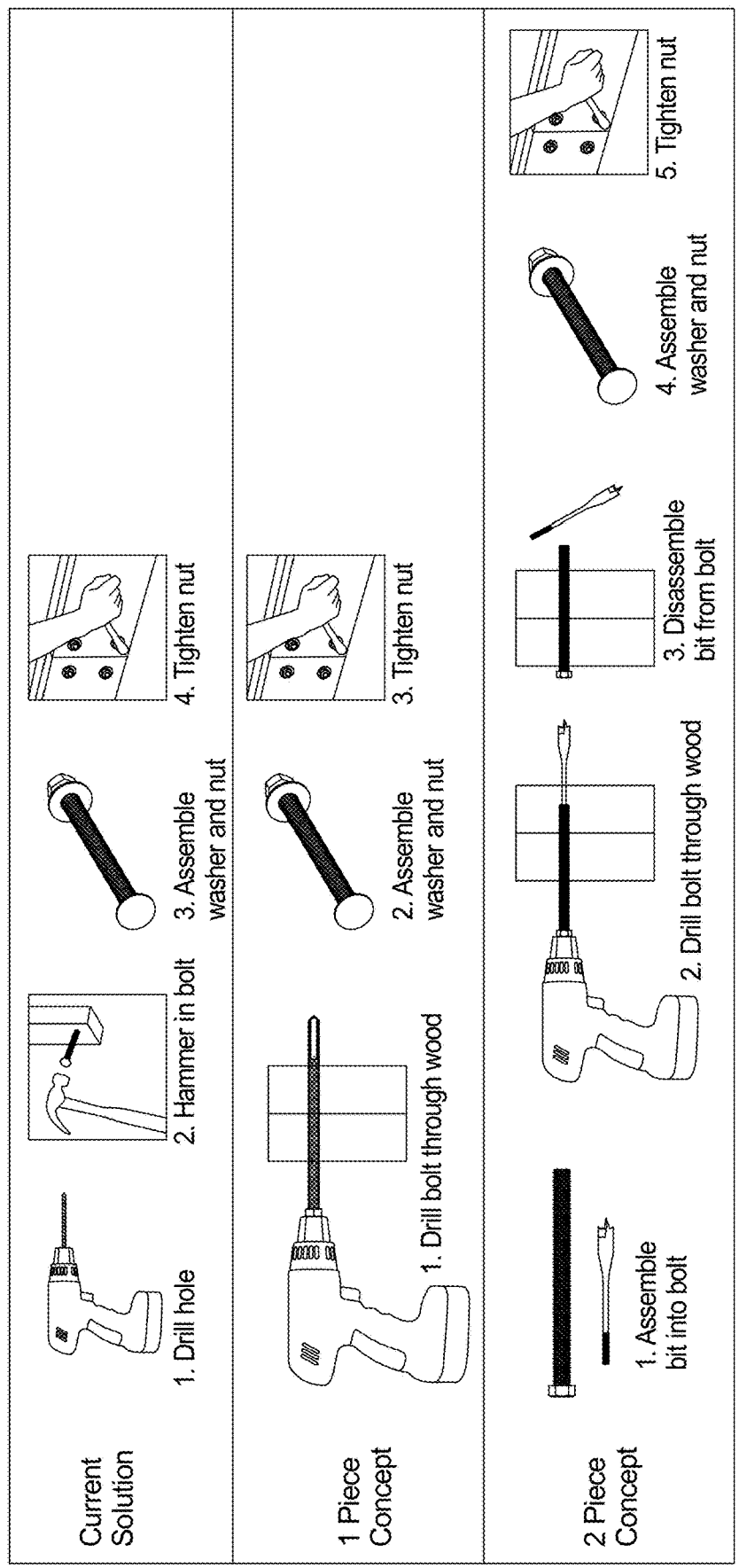
Figure 6A:
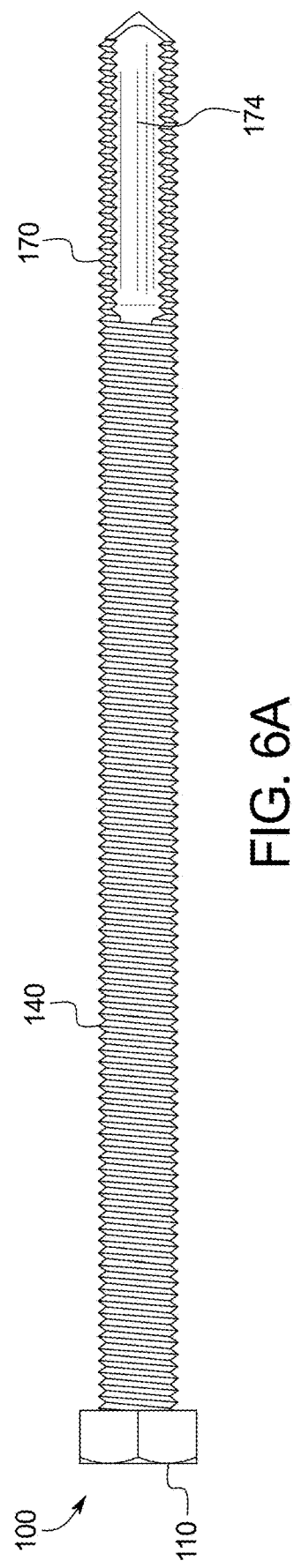
Figure 6B:
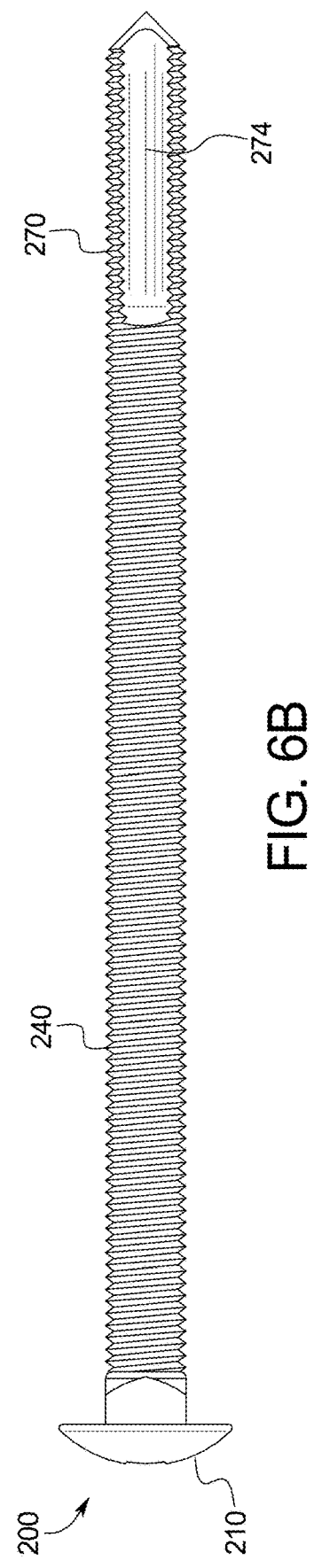
Figure 9:
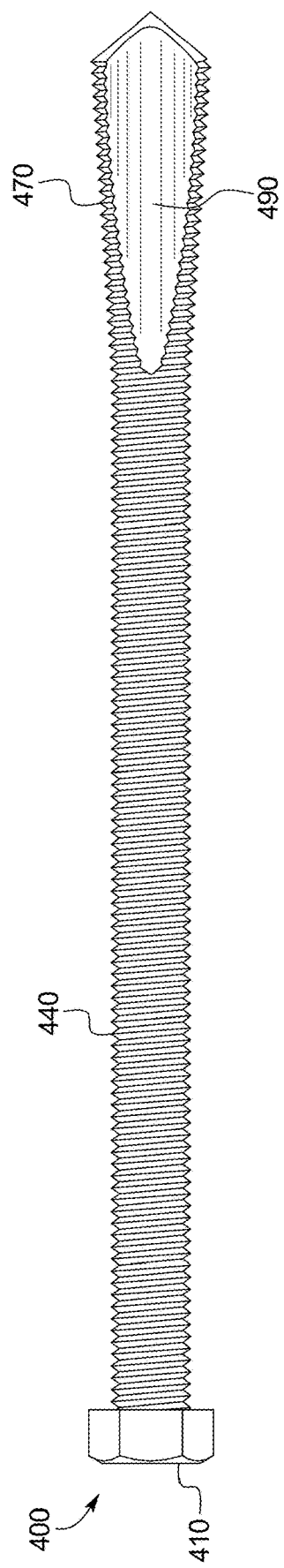
Figure 11:
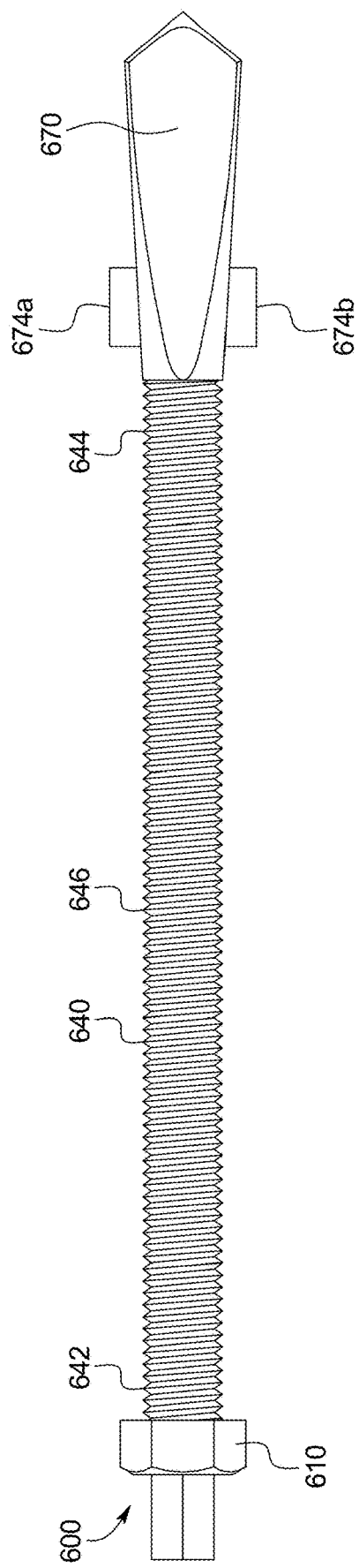
Figure 12A:
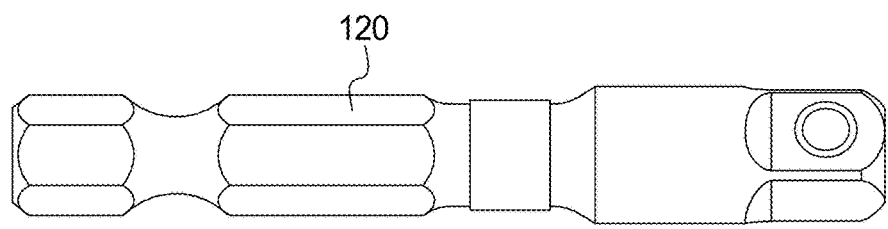
Figure 12B:
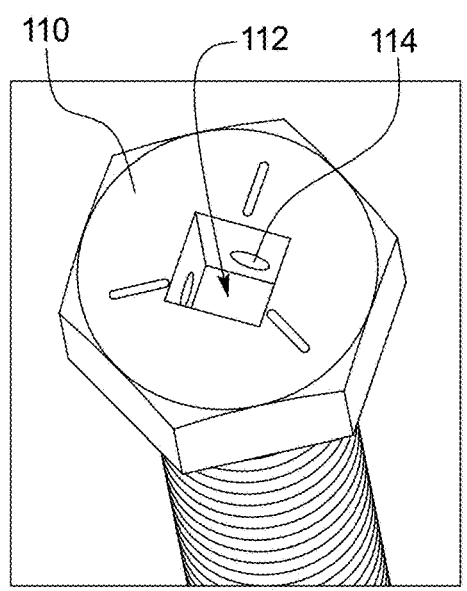
Figure 12C:
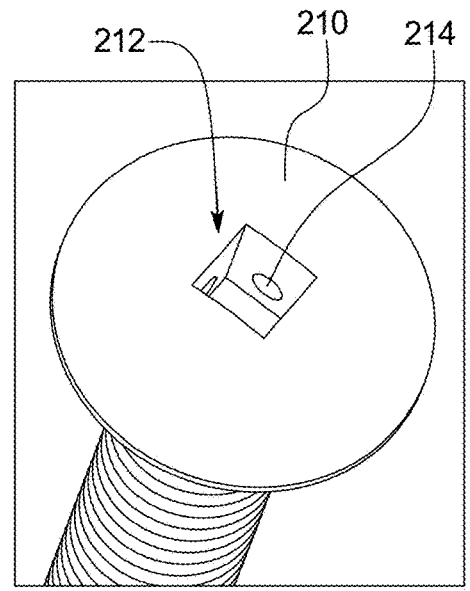
Figure 13:
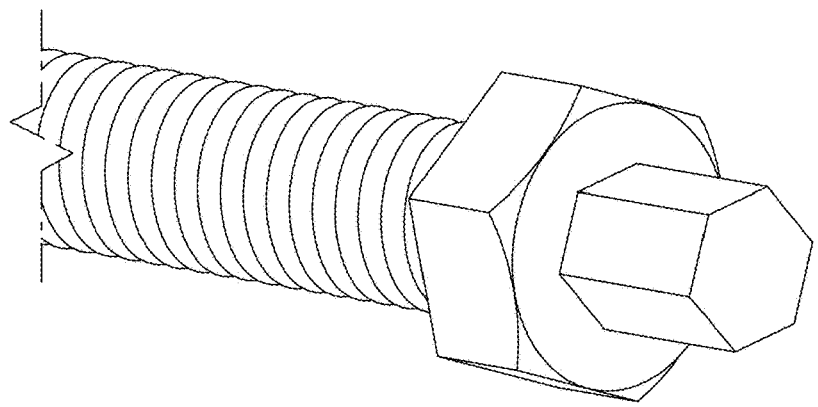
Figure 14A:
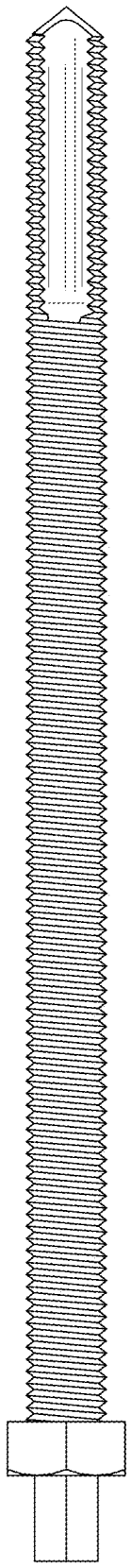
Figure 14B:
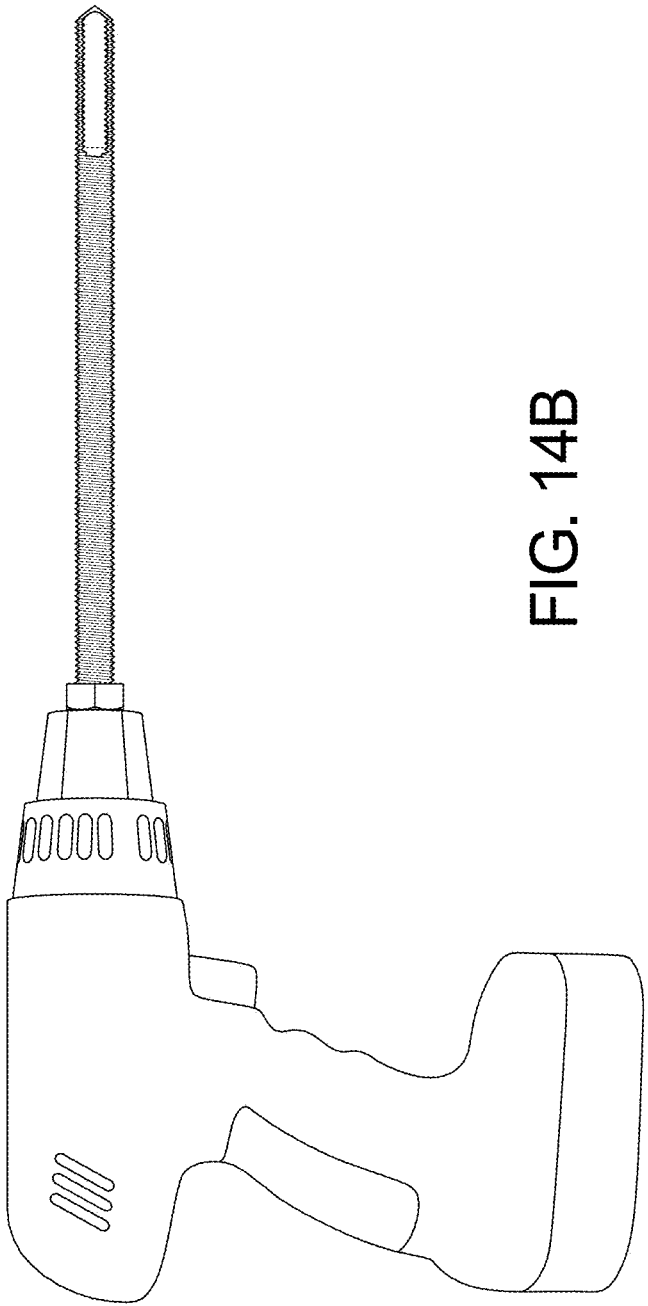
Figure 15B:
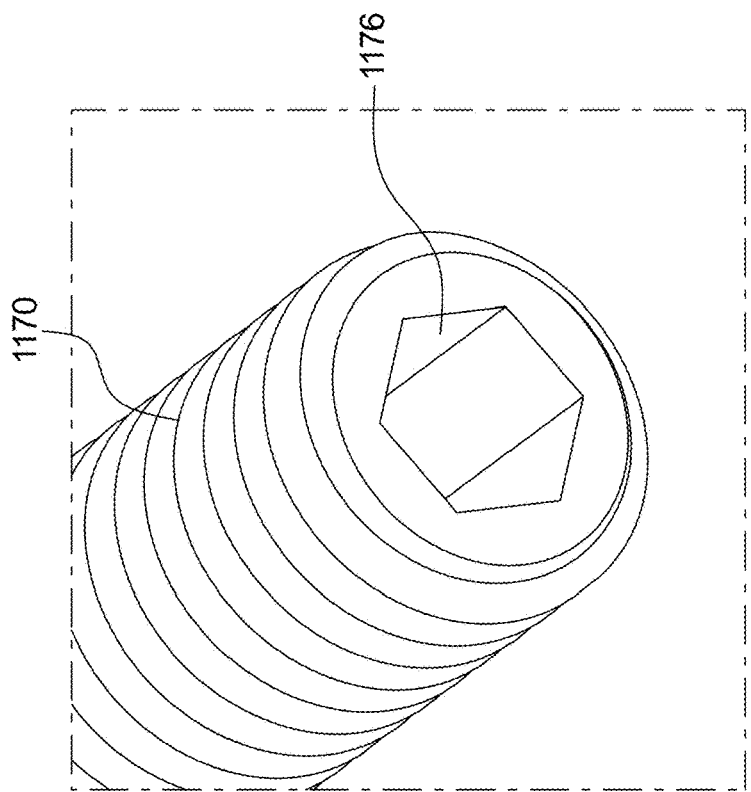
Figure 15A:
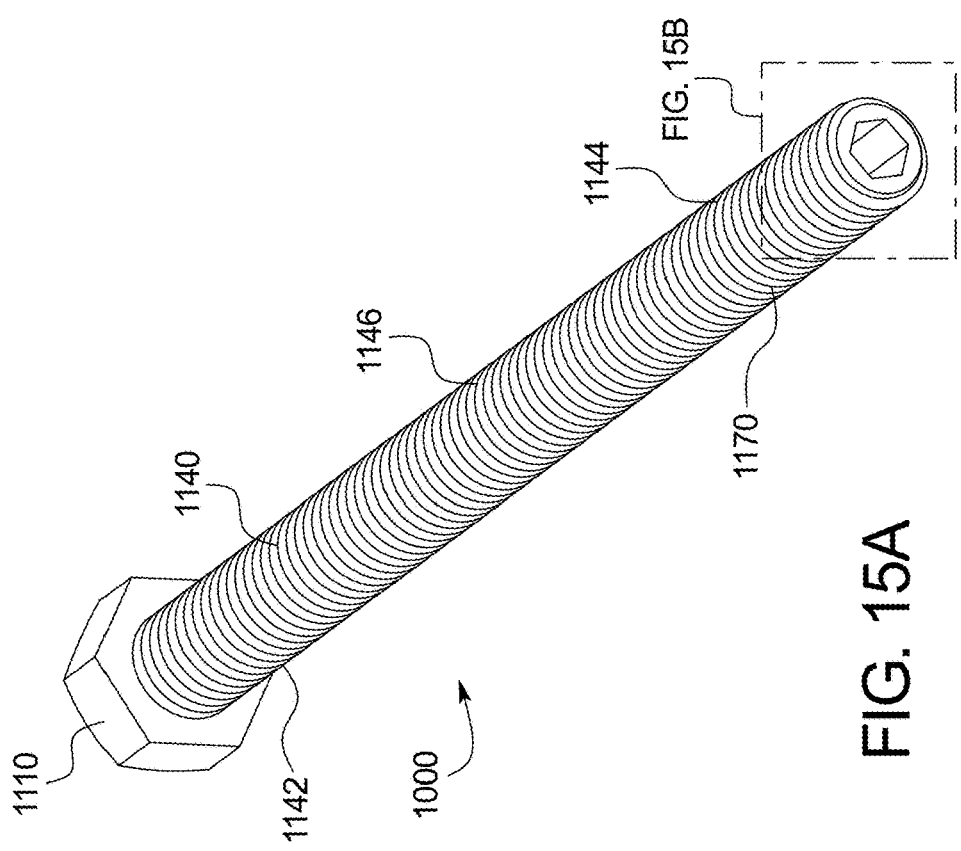
Figure 16A:
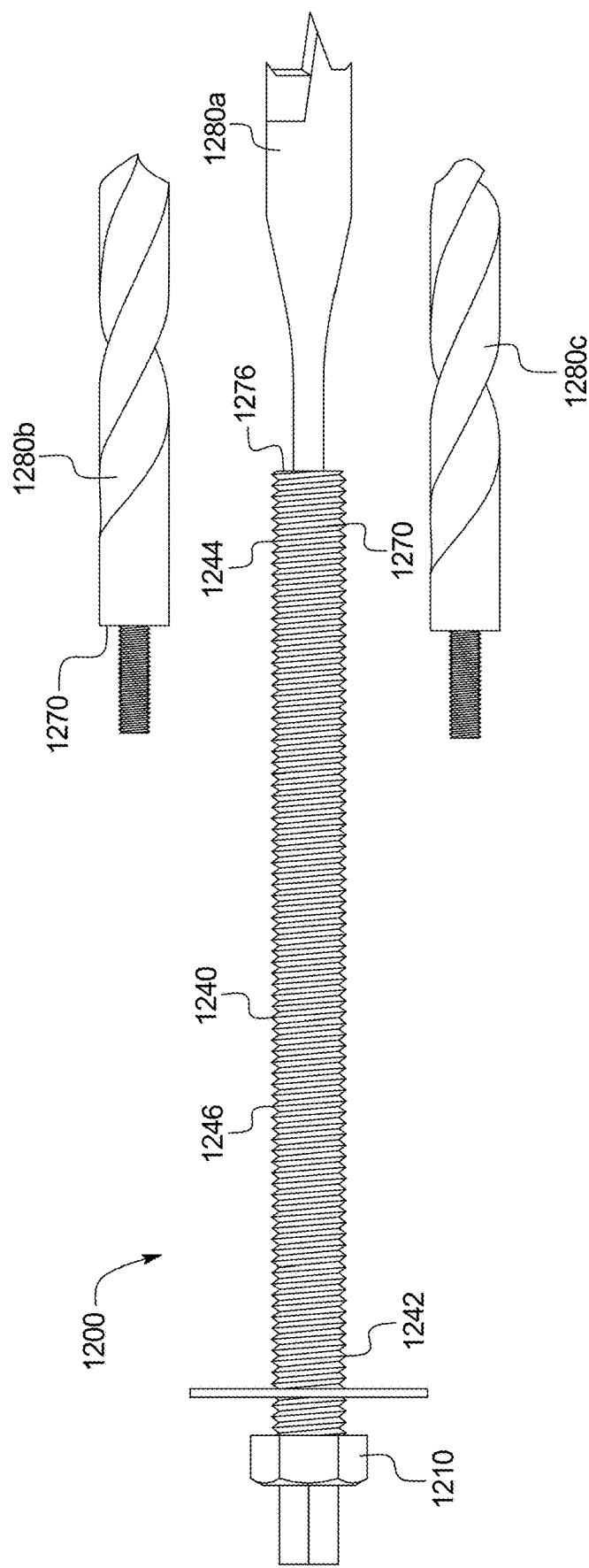
Figure 18A:
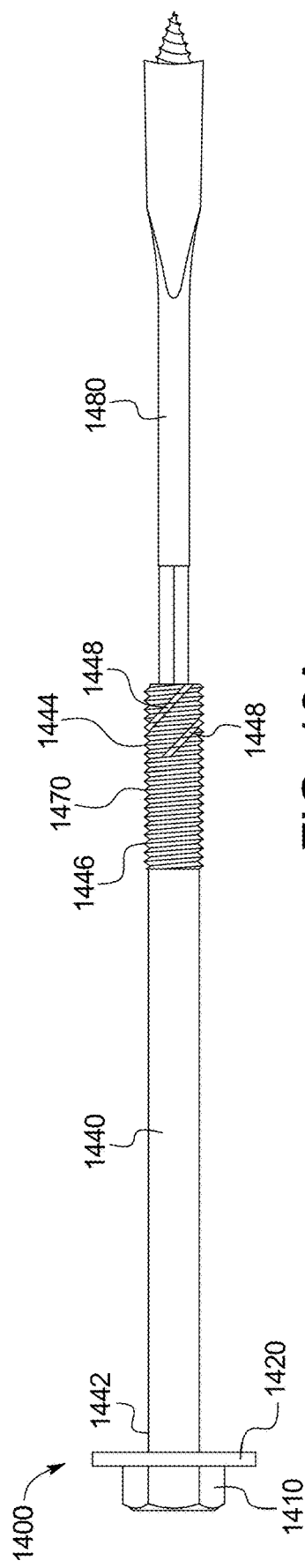
Figure 18B:
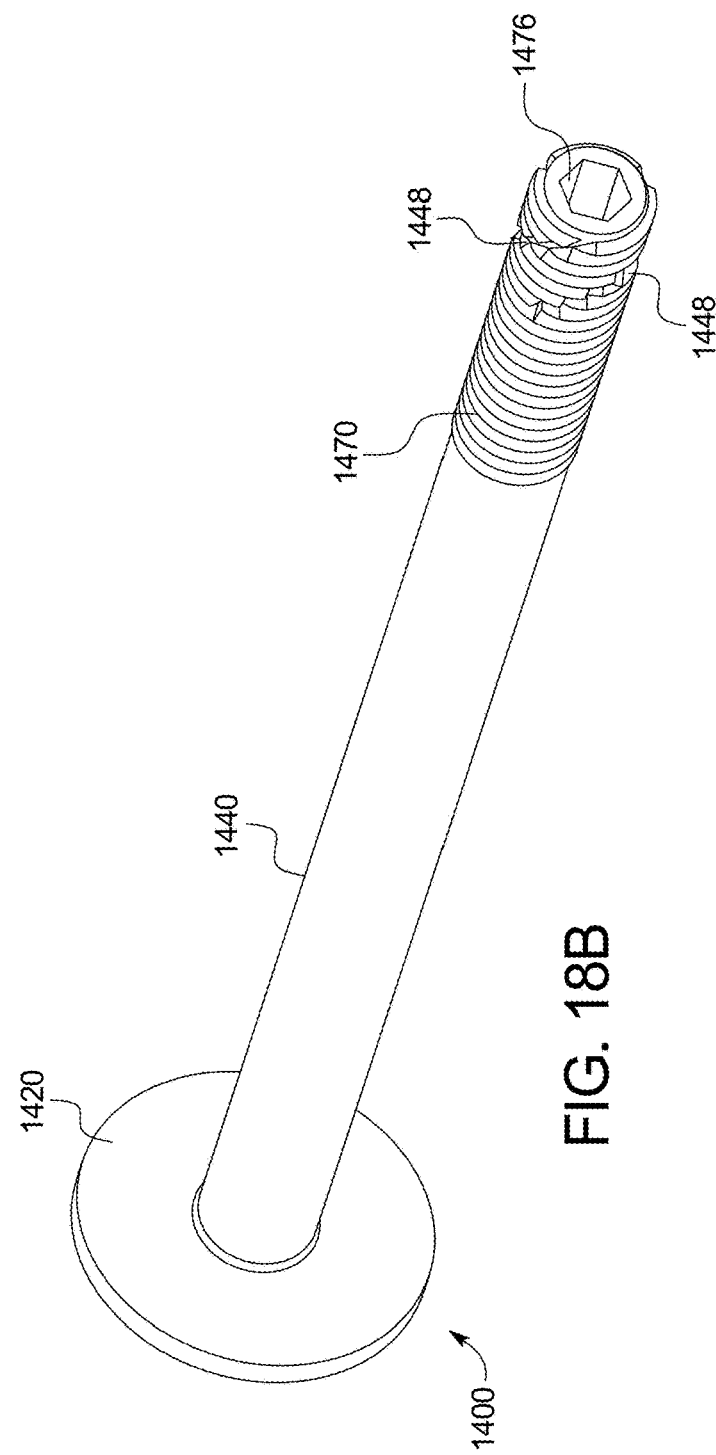
Figure 19D:
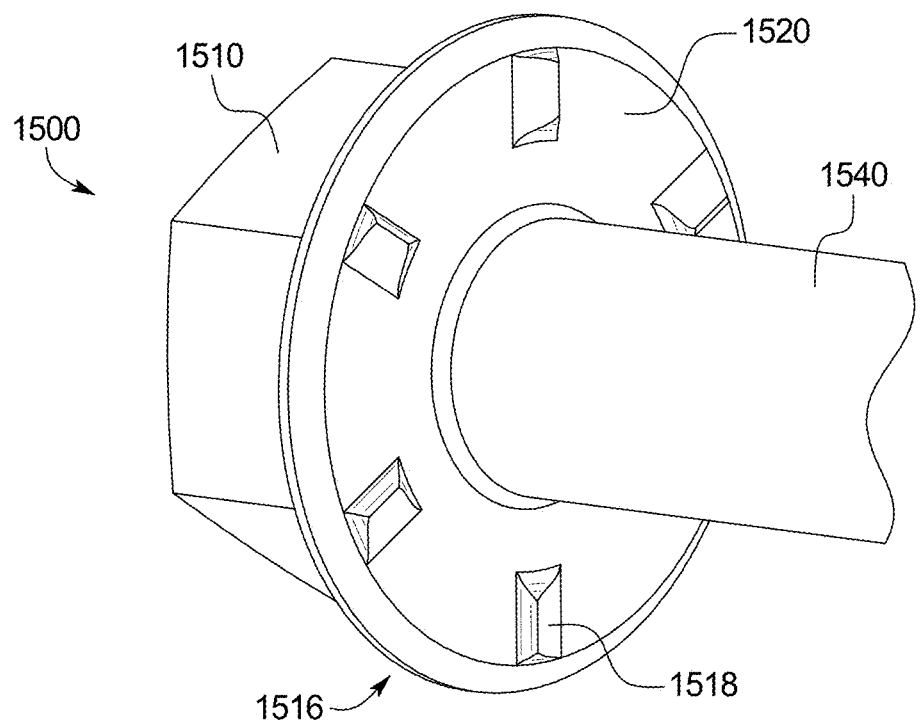
Figure 19E:
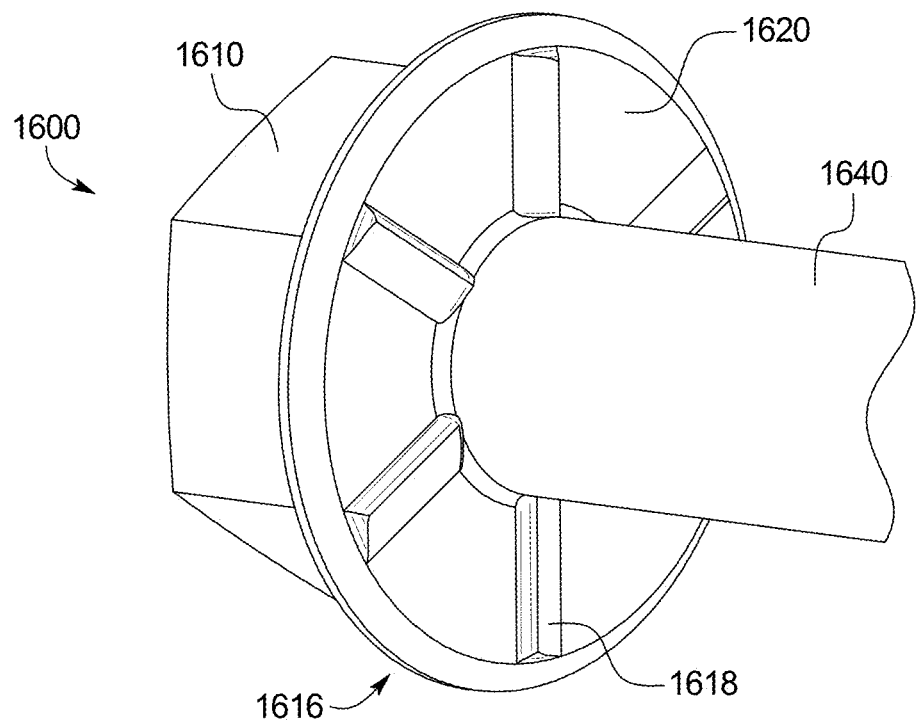

Having thus described embodiments of the present disclosure in general terms, reference will now be made to the accompanying drawings, which are not necessarily drawn to scale, and wherein:

FIG. 1A is a side view of a prior art fastener showing a head portion and a shank portion of the fastener;

FIG. 1B is a side view of another prior art fastener showing a head portion and a shank portion of the fastener;

FIG. 2A is a schematic view showing a prior art American Wood Council (AWC) requirement for post-to-beam fastening;

FIG. 2B is a schematic view showing a prior art International Residential Code (IRC) requirement for post-to-beam fastening;

FIG. 3 is a side perspective view of one example embodiment of a fastener of the present disclosure, showing a head, a shank, and a tip of the fastener, and showing a fastener driving tool adapter that engages with the head of the fastener;

FIG. 4 is a side perspective view of another example embodiment of the fastener of the present disclosure, showing a head, a shank, a tip, a tip recess, and a drill bit received in the tip recess;

FIG. 5 is a schematic view showing a comparison of a known method of post-to-beam fastening for the prior art fasteners of FIGS. 1A and 1B, a method of post-to-beam fastening for the fastener of FIG. 3, and a method of post-to-beam fastening for the fastener of FIG. 4;

FIG. 6A is a side perspective view of the fastener of FIG. 3;

FIG. 6B is a side perspective view of the fastener of FIG. 4;

FIG. 7 is an enlarged fragmentary perspective view of a portion of the shank and tip of the fastener of FIG. 3;

FIG. 8A is a side perspective view of another example embodiment of a fastener of the present disclosure, showing a head, a shank, and a breakaway tip of the fastener;

FIG. 8B is a side perspective view of the fastener of FIG. 8A shown after the breakaway tip is separated from the shank of the fastener;

FIG. 9 is a side view of another example embodiment of a fastener of the present disclosure, showing a head, a shank, and a tip of the fastener;

FIG. 10A is an enlarged side perspective view of another example embodiment of a fastener of the present disclosure, showing a head, a shank, and a breakaway tip of the fastener;

FIG. 10B is a side view of the fastener of FIG. 10A shown after the breakaway tip is separated from the shank of the fastener;

FIG. 11 is a perspective view of another example embodiment of a fastener of the present disclosure, showing a head, a shank, and a winged tip of the fastener;

FIG. 12A is a side view of the fastener driving tool adapter of FIG. 3;

FIG. 12B is a fragmentary enlarged front prospective view of the head of the fastener of FIG. 3;

FIG. 12C is a fragmentary enlarged top prospective view of the head of the fastener of FIG. 4;

FIG. 13 is a fragmentary enlarged top prospective view of another example embodiment of a head of a fastener of the present disclosure, showing a head, and a head cap extending from the head of the fastener;

FIG. 14A is a perspective view of the fastener of FIG. 13;

FIG. 14B is an enlarged perspective view of a fastener driving tool and the fastener of FIG. 13, showing the head cap of the fastener connected to the fastener driving tool;

FIG. 15A is a perspective end view of another example embodiment of a fastener of the present disclosure, showing a head, a shank, a tip, and a tip recess of the fastener;

FIG. 15B is a fragmentary enlarged perspective view of the tip and the tip recess of the fastener of FIG. 15A;

FIG. 16A is a perspective view of another example embodiment of a fastener of the present disclosure, showing a head, a shank, a tip, a threaded tip recess, and a plurality of drill tips that can be threaded into the threaded drill tip recess of the fastener;

FIG. 16B is a fragmentary enlarged perspective view of the shank, the tip, the threaded tip recess, and one of the plurality of drill tips of FIG. 16A;

FIG. 17A is a side view of another example embodiment of a fastener of the present disclosure, showing a head, a plurality of ribs on a bottom surface of the head, a shank, and a tip of the fastener;

FIG. 17B is an enlarged bottom perspective view of the head of the fastener of FIG. 17A;

FIG. 17C is an enlarged top perspective view of the head of the fastener of FIG. 17A;

FIG. 17D is a side cross-sectional view of the fastener of FIG. 17A;

FIG. 17E is an enlarged fragmentary side view of the head and the part of the shank of the fastener of FIG. 17A;

FIG. 17F is an enlarged fragmentary side view of the plurality of ribs on the bottom surface of the head of the fastener of FIG. 17A;

FIG. 18A is a side view of another example embodiment of a fastener of the present disclosure and a drill bit of the present disclosure removably connected to the fastener;

FIG. 18B is a perspective view of the fastener of FIG. 18A;

FIG. 18C is another perspective view of the fastener of FIG. 18A;

FIG. 18D is a side view of the tip of the fastener of FIG. 18A;

FIG. 19A is a side view of another example embodiment of a fastener of the present disclosure;

FIG. 19B is a perspective view of the fastener of FIG. 19A;

FIG. 19C is an enlarged fragmentary side view of a rib on the bottom surface of the head of the fastener of FIG. 19A;

FIG. 19D is an enlarged fragmentary perspective view of an example embodiment of the plurality of ribs on the bottom surface of the head of the fastener of FIG. 19A; and FIG. 19E is an enlarged fragmentary perspective view of the plurality of ribs on the bottom surface of the head of another example embodiment of the present disclosure.

DETAILED DESCRIPTION

While the devices and methods described herein may be embodied in various forms, the drawings show and the specification describes certain exemplary and non-limiting embodiments. Not all of the components shown in the drawings and described in the specification may be required, and certain implementations may include additional, different, or fewer components. Variations in the arrangement and type of the components; the shapes, sizes, and materials of the components; and the manners of connections of the components may be made without departing from the spirit or scope of the claims. Unless otherwise indicated, any directions and/or order referred to in the specification reflect the orientations of the components shown in the corresponding drawings and do not limit the scope of the present disclosure. Further, terms that refer to mounting methods, such as mounted, connected, etc., are not intended to be limited to direct mounting methods but should be interpreted broadly to include indirect and operably mounted, connected, and like mounting methods. This specification is intended to be taken as a whole and interpreted in accordance with the principles of the present disclosure and as understood by one of ordinary skill in the art.

FIGS. 1A and 1B illustrate example known hex head fastener 10 and an example known carriage head fastener 50. The example known hex head fastener 10 includes: (1) a shank 20; and (2) a head 30 integrally connected to an end of the shank 20. The example known carriage head fastener 50 includes: (1) a shank 60; and (2) a head 70 integrally connected to an end of the shank 60.

Various embodiments of the present disclosure are used for post-to-beam fastening applications. Additionally, these embodiments may be adapted for other decking construction processes. When installing a deck post to a deck beam, the International Code Council (ICC) presently requires 2½ inch (6.35 cms) pre-drilled through-bolts per connection. FIGS. 2A and 2B show the American Wood Council (AWC) and International Residential Code (IRC) requirements for post-to-beam fastening.

FIGS. 3, 6A, 7, and 12B illustrate one example embodiment of the post-to-beam fastener of the present disclosure that is generally indicated by numeral 100. This illustrated example embodiment shows selected components of the post-to-beam fastener 100, and other components of the post-to-beam fastener 100 not discussed herein will be readily understood by those skilled in the art.

The illustrated example post-to-beam fastener 100, sometimes referred to as a "1 Piece Fastener Concept," includes: (1) a head 110; (2) a shank 140 integrally connected to the head 110 at a first end 142 of the shank 140; and (3) a tip 170 integrally connected to the shank 140 at a second end 144 of the shank 140. In this illustrated example, the post-to-beam fastener 100 (i.e., the 1 Piece Concept) is configured as a ½ inch (1.27 cms) diameter bolt (i.e., fastener 100) with a tip 170 and a head 110 opposite of the tip 170. It should be appreciated that while the post-to-beam fastener 100 is described as a ½ inch (1.27 cms) diameter bolt, any suitable different type of fastener and any suitable different size of fastener may be used in accordance with the present disclosure.

In this illustrated example, the head 110 has a hexagonal shape and includes a retaining feature. More specifically, the head includes surfaces that define: (1) a recess 112 defined in a top surface (not labeled) of the head 110; and (2) a recess indent 114 defined in at least one sidewall (not labeled) of the recess 112. In this illustrated example, the surfaces of the head 110 that define the recess 112 are configured to engage with a fastener driving tool adapter 120 during driving and/or insertion of the fastener 100 into a workpiece (e.g., the beam or the post) (not shown). In this illustrated example, the surfaces that define the recess indent 114 are configured to positively retain the fastener driving tool adapter 120 in the recess 112 of the fastener 100 while a driving tool (not shown) drives the fastener 100 into a workpiece. As such, the head 110 retains the fastener driving tool adapter 120 within the recess 112 while the fastener 100 is moved axially forward and backward within the workpiece during driving and/or insertion of the fastener 100 into the workpiece.

In this illustrated example, the shank 140 includes a plurality of thread formations 146 extending outwardly from the shank 140 to form a threaded shank that connects to the head 110 at the first end 142 of the shank 140. In this illustrated example, the fastener 100 has the tip 170 at the second end 144 of the shank 140, and the shank 140 has a longitudinal axis extending from the head 110 to the tip 170.

In this illustrated example, the tip 170 of the fastener 100 is configured as a drill tip, which may be milled or forged. In this illustrated example, the head 110 includes a feature to positively retain the fastener 100 to be moved forward and backward axially. In this illustrated example, the head 110, the shank 140, and the drill tip of tip 140 form a unitary structure that enables a user to drill and install the fastener 100 in one operation. That is, the fastener 100 including the tip 170 (i.e., the drill tip) drills, drives and/or inserts the fastener 100 into the workpiece without having to use a separate drill bit to first drill or otherwise form a hole through the workpiece. In this illustrated example, the tip 170 of the fastener 100 includes a flute 174 formed in the tip 170 of the fastener 100. In this illustrated example, the flute 174 is positioned proximate to the end of the tip 170; however other positions of the flute 174 are possible in accordance with the present disclosure. As such, the flute 174 is configured to collect wood chips generated by drilling (i.e., the cutting action) of the drill tip on the workpiece (e.g., the deck post and the deck beam). During operation, to improve the efficiency of the drill tip, wood chips can be removed periodically during drilling, driving and/or insertion of the fastener 100 through the workpiece (e.g., the deck post and the deck beam).

In this illustrated example, removal of the wood chips generated by drilling through the workpiece and collected in the flute 174, is facilitated by movement of the fastener 100 forward and backward axially. For example, as best seen in FIGS. 3, 6A, and 12B, the head 110 of the fastener 100 includes a square shaped recess 112 including the recess indent 114 (or hole) which enables the head to lock an adapter into the recess 112 of the head 110 (and positively retain the fastener). This permits the fastener 100 to be pulled out of the hole being generated in the workpiece, clearing out the wood chips collected from the flutes 174 of the tip 170. This method of drilling is known by a person skilled in the art as "peck-drilling."

FIGS. 6B and 12C illustrate another example embodiment of the post-to-beam fastener of the present disclosure that is generally indicated by numeral 200. This illustrated example embodiment of the post-to-beam fastener 200 is similar to fastener 100, as discussed above. This illustrated example embodiment shows selected components of the post-to-beam fastener 200, and other components of the post-to-beam fastener 200 not discussed herein will be readily understood by those skilled in the art.

The illustrated example post-to-beam fastener 200, also referred to as a "1 Piece Fastener Concept," includes: (1) a head 210; (2) a shank 240 integrally connected to the head 210 at a first end 242 of the shank 240; and (3) a tip 270 suitably connected to the shank 240 at a second end 244 of the shank 140. In this illustrated example, the post-to-beam fastener 200 (i.e., the 1 Piece Fastener Concept) is configured as a ½ inch (1.27 cms) diameter bolt (i.e., fastener 200) with the tip 270 and the head 210 opposite of the tip 170. It should be appreciated that while the post-to-beam fastener 100 is described as a ½ inch (1.27 cms) diameter bolt, any suitable different type of fastener and any suitable different size of fastener may be used in accordance with the present disclosure.

In this illustrated example, the head 210 is configured as a carriage bolt head and includes a retaining feature. More specifically, the head 210 includes surfaces that define: (1) a recess 212 defined in a top surface (not labeled) of the head 210; and (2) a recess indent 214 defined in at least one sidewall (not labeled) of the recess 212. In this illustrated example, the surfaces that define the recess 212 are configured to engage with the fastener driving tool adapter 120 (shown in FIGS. 3 and 12A) during drilling, driving and/or insertion of the fastener 200 into a workpiece (e.g., the beam or the post) (not shown). In this illustrated example, the surfaces that define the recess indent 214 are configured to positively retain the fastener driving tool adapter 120 in the recess 212 of the fastener 200 while a fastener driving tool (not shown) drives the fastener 200 into a workpiece. As such, the head 210 retains the fastener driving tool adapter 120 within the recess 212 while the fastener 200 is moved axially forward and backward within the workpiece during drilling, driving and/or insertion of the fastener 200 into the workpiece.

In this illustrated example, the shank 140 includes: (1) a square shoulder 245 adjacent to the first end 242 of the shank 240; and (2) a plurality of thread formations 246 extending outwardly from the shank 240 to form a threaded shank that connects to the head 210 at the square shoulder 245 of the shank 140. In this illustrated example, the fastener 200 has a tip 270 at second end 244 of the shank 240, and the shank 240 has a longitudinal axis extending from the head 210 to the tip 270.

In this illustrated example, the tip 270 of the fastener 200 is configured as a drill tip, which may be milled or forged. In this illustrated example, the head 210 includes a feature to positively retain the fastener 200 to be moved forward and backward axially. In this illustrated example, the head 210, the shank 240, and the drill tip of tip 270 form a unitary structure that enables a user to drill and install the fastener 200 in one operation. That is, the fastener 200 including the tip 270 (i.e., the drill tip) drills, drives and/or inserts the fastener 200 into the workpiece without having to use a separate drill bit to first drill or otherwise form a hole through the workpiece. In this illustrated example, the tip 270 of the fastener 200 includes a flute 274 formed in the tip 270 of the fastener 200. In this illustrated example, the flute 274 is positioned proximate to the end of the tip 270, however other positions of the flute 274 are possible. As such, the flute 274 is configured to collect wood chips generated by drilling (i.e., the cutting action) of the drill tip on the workpiece (e.g., the deck post and the deck beam). During operation, to improve the efficiency of the drill tip, wood chips can be removed periodically during drilling, driving and/or insertion of the fastener 200 through the workpiece.

In this illustrated example, removal of the wood chips generated by drilling through the workpiece and collected in the flute 274, is facilitated by movement of the fastener 200 forward and backward axially. For example, as best seen in FIGS. 6B, and 12C the head 210 of the fastener 200 includes surfaces that define a square shaped recess 212 including the recess indent 214 (or hole) and that lock an adapter into the recess 212 of the head 210 (i.e., positively retains the fastener). This permits the fastener 200 to be pulled out of the hole being generated in the workpiece, clearing out the woodchips collected from the flute 274 of the tip 270.

Referring to fasteners associated with the 1 Piece Fastener Concept, several different variations of the drill tip on the end of the fastener are possible in accordance with the present disclosure. As discussed above, the drill tip (i.e., drill point) enables the user to drill, drive and/or install the fastener using a singular, complete assembly including a fastener and a drill tip. As such, there is no need for the user to carry separate drill bits. In various embodiments, the flutes (e.g., drill flutes or cutting flutes) of the drill tip are formed or otherwise defined into the fastener itself. In various embodiments, the flutes of the drill tip are approximately 2 inches (5.08 cms) long. Peck-drilling is typically used with flutes of such a length (e.g., 2 inches (5.08 cms) long). However, it will be appreciated that the flutes can vary in size, shape and number flutes that are defined on the tip of the fastener. As such, in various other embodiments, longer drill flutes could be used, which may reduce the amount of backward and forward drilling (i.e., peck-drilling) used but may require the fastener to be longer overall.

FIGS. 8A, 8B, 9, 10A, 10B, and 11 illustrate several different drill tip and/or flute configurations. In some embodiments, the drill tip may be broken, or knocked off of the end of the shank of the fastener by a hammer, or other such tool. In some embodiments, the fastener includes a breakaway tip including the drill tip, and at least a portion of the flute. In these embodiments, the breakaway tip is broken off at a breakaway line or breakaway joint. In these embodiments, the breakaway tip is broken off from the fastener at the breakaway line or breakaway joint after a nut is installed on the fastener and tightened against the workpiece (e.g., the deck post and/or the deck beam).

In particular, FIGS. 8A and 8B, illustrate selected components of another example embodiment of a post-to-beam fastener generally indicated by numeral 300. Post-to-beam fastener 300 is similar to fastener 100 discussed above and includes a milled drill tip and flute formed or otherwise defined in the tip of the post-to-beam fastener 300.

The illustrated example post-to-beam fastener 300 includes: (1) a head 310; (2) a shank 340 integrally connected to the head 310 at a first end 342 of the shank 340; and (3) a tip 380 removably connected to the shank 340 at a second end 344 of the shank 340. In this illustrated example, the post-to-beam fastener 300 is configured as a ½ inch (1.27 cms) diameter bolt (i.e., fastener) with the head 310 opposite of the tip 380. It should be appreciated that while the post-to-beam fastener 300 is described as a ½ inch (1.27 cms) diameter bolt, any suitable different type of fastener and any suitable different size of fastener may be used in accordance with the present disclosure.

In this illustrated example, the head 310 is configured with a hexagonal shape and includes a retaining feature. More specifically, the head 310 includes surfaces that define: (1) a recess (not shown) defined in a top surface (not labeled) of the head 310; and (2) a recess indent (not shown) defined in at least one sidewall (not labeled) of the recess. In this illustrated example, the surfaces that define the recess are configured to engage with a fastener driving tool adapter (not shown) during drilling, driving and/or insertion of the fastener 300 into a workpiece (e.g., the beam or the post) (not shown). In this illustrated example, the surfaces that define the recess indent are configured to positively retain the fastener driving tool adapter in the recess of the fastener 300 while a fastener driving tool (not shown) drills, drives, and/or inserts the fastener 300 into a workpiece. As such, the head 310 retains the fastener driving tool adapter within the recess while the fastener 100 is moved axially forward and backward within the workpiece during drilling, driving and/or insertion of the fastener 300 into the workpiece.

In this illustrated example, the shank 340 includes: (1) a plurality of thread formations 346 extending outwardly from the shank 340 to form a threaded shank that connects to the head 310 at the first end 342 of the shank 340; and (2) a breakaway line or breakaway joint 360 defined between the second end 344 of the shank 340 and the tip 380 of the fastener 300. In this illustrated example, the threaded shank (i.e., shank 340) connects to the head 310 at the first end 342 of the shank 340. In this illustrated example, the fastener 300 has a the tip 380 at second end 344 of the shank 340, and the shank 340 has a longitudinal axis extending from the head 310 to the tip 370.

In this illustrated example, the drill tip of tip 380 includes a flute 384 formed in the tip 380 of the fastener 300. More specifically, the flute 384 is formed on the tip 380 and positioned between the breakaway line or breakaway joint 360 and the end of the tip 384, however other positions of the flute 384 are possible. As such, the flute 384 helps to collect wood chips generated by drilling (i.e., the cutting action) of the drill tip on the workpiece (e.g., the deck post and the deck beam). In this illustrated example, the tip 380 of the fastener 300 is configured as a breakaway drill tip, which is removed from the shank 340 of the fastener 300 once the drilling, driving, and/or insertion of the fastener 300 is complete. More specifically, the breakaway drill tip of tip 380 enables a user to remove the drill tip from the fastener 300 once the hole is drilled through the workpiece and a nut (not shown) is installed around the thread formations 346 of the shank 340 and suitably tightened against the workpiece. As such, the fastener 300 including the tip 380 drills, drives and/or inserts the fastener 300 into the workpiece without having to use a separate drill bit to first drill or otherwise form a hole through the workpiece.

FIGS. 9, 10A, and 10B illustrate selected components of another example embodiment of a post-to-beam fastener generally indicated by numeral 400. Post-to-beam fastener 400 is similar to fastener 100 discussed above. Post-to-beam fastener 400 includes a forged drill tip (i.e., forged drill point). While the forged drill tip is similar to the milled drill tip and flute discussed above, the process to manufacture forged drilling tips is less expensive. In this illustrated example embodiment, an ending diameter of the forged drill tip of the fastener 400 is slightly larger than the ½ inch (1.27 cms) major diameter of threads of the fastener 400. The slightly larger ending diameter of the forged drill tip produces a hole in the workpiece that is slightly larger than the fastener 400. This increased diameter of the hole in the workpiece makes installation of the fastener 400 easier. In this illustrated example, the fastener 400 includes a breakaway tip that is removed or otherwise broken off before a nut is suitably installed on the fastener and suitably tightened against the workpiece because the ending diameter of the forged drill tip is larger than the threads of the fastener 400. In this illustrated example, the breakaway tip (see FIGS. 10A and 10B) is used and knocked off by a hammer or other such tool before installation of the nut (not shown) onto the fastener 400.

The illustrated example post-to-beam fastener 400 includes: (1) a head 410; (2) a shank 440 integrally connected to the head 410 at a first end 442 of the shank 440; and (3) a tip 490 suitably connected to the shank 440 at a second end 444 of the shank 440. In this illustrated example, the post-to-beam fastener 400 is configured as a ½ inch (1.27 cms) diameter bolt (i.e., fastener 400) with the head 410 opposite of the tip 490. It should be appreciated that while the post-to-beam fastener 400 is described as a ½ inch (1.27 cms) diameter bolt, any suitable different type of fastener and any suitable different size of fastener may be used in accordance with the present disclosure.

In this illustrated example, the head 410 is configured with a hexagonal shape and includes a retaining feature. More specifically, the head 410 includes surfaces that define: (1) a recess (not shown) defined in a top surface (not labeled) of the head 410; and (2) a recess indent (not shown) defined in at least one sidewall (not labeled) of the recess. In this illustrated example, the surfaces that define the recess are configured to engage with a fastener driving tool adapter (not shown) during drilling, driving and/or insertion of the fastener 400 into a workpiece (e.g., beam or post) (not shown). In this illustrated example, the surfaces that define the recess indent are configured to positively retain the fastener driving tool adapter in the recess of the fastener 400 while a fastener driving tool (not shown) drills, drives and/or inserts the fastener 400 into a workpiece. As such, the head 410 retains the fastener driving tool adapter within the recess while the fastener 400 is moved axially forward and backward within the workpiece during drilling, driving and/or insertion of the fastener 400 into the workpiece.

In this illustrated example, the shank 440 includes: (1) a plurality of thread formations 446 extending outwardly from the shank 440 to form a threaded shank that connects to the head 410 at the first end 442 of the shank 340; and (2) a breakaway line or breakaway joint 460 disposed between the second end 444 of the shank 440 and the tip 490 of the fastener 400. In this illustrated example, the threaded shank (i.e., shank 440) connects to the head 410 at the first end 442 of the shank 440. In this illustrated example, the fastener 400 forms the tip 490 at second end 444 of the shank 440, and the shank 440 has a longitudinal axis extending from the head 410 to the tip 490.

In this illustrated example, the tip 490 includes: (1) a first outer diameter 492 at a first end of the tip 490 adjacent to the breakaway line or breakaway joint 460; and (2) a second outer diameter 494 at a second end of the tip 490 opposite the first end. In this illustrated example, the second outer diameter 494 of the tip 490 is slightly larger than the major diameter of the thread formations 446 of the shank 440. As such, the tip 490 of the fastener 400 produces a hole in the workpiece that is slightly larger than the major diameter of the thread formations 446 of the shank 440. In this illustrated example, the tip 490 of the fastener 400 is configured as a breakaway drill tip, which is removed from the shank 440 of the fastener 400 once a hole is drilled through the workpiece. As such, the fastener 400 including the tip 490, drills a hole into the workpiece without having to use a separate drill bit to drill or otherwise form a hole through the workpiece. In this illustrated example, once the hole is drilled through the workpiece, the tip 490 is removed from the fastener 400 at the breakaway line or breakaway joint 460 such that a nut (not shown) is suitably installed around the thread formations 446 of the shank 440 and suitably tightened against the workpiece.

FIG. 11 illustrates selected components of an additional example embodiment of a post-to-beam fastener generally indicated by numeral 600. The post-to-beam fastener 600 is similar to fastener 100 discussed above and includes a winged drill tip (i.e., winged cutting tip) formed or otherwise defined in the tip of the post-to-beam fastener 600. In this illustrated example embodiment, the winged drill tip of the fastener 600 is used to cut, drill, or otherwise form a proper hole diameter in a workpiece for the installation of the fastener 600. In certain embodiments, the winged cutting tip of the fastener 600 is a breakaway tip. In certain other embodiments, only the wings of the winged cutting tip breakaway from the fastener. For example, the wings break off of the winged cutting tip when a specialized nut is installed on the fastener and suitably tightened against the deck post and deck beam.

The illustrated example post-to-beam fastener 600 includes: (1) a head 610; (2) a shank 640 integrally connected to the head 610 at a first end 642 of the shank 640; and (3) a tip 670 suitably connected to the shank 640 at a second end 644 of the shank 640. In this illustrated example, the post-to-beam fastener 600 is configured as ½ inch (1.27 cms) diameter bolt (i.e., fastener 600) with the head 610 opposite of the tip 670. It should be appreciated that while the post-to-beam fastener 600 is described as a ½ inch (1.27 cms) diameter bolt, any suitable different type of fastener and any suitable different size of fastener may be used in accordance with the present disclosure.

In this illustrated example, the head 610 is configured with a hexagonal shape and includes a retaining feature. More specifically, the head 610 includes surfaces that define: (1) a recess (not shown) defined in a top surface (not labeled) of the head 610; and (2) a recess indent (not shown) defined in at least one sidewall (not labeled) of the recess. In this illustrated example, the surfaces that define the recess are configured to engage with a fastener driving tool adapter (not shown) during drilling, driving and/or insertion of the fastener 600 into a workpiece (e.g., beam or post) (not shown). In this illustrated example, the surfaces that define the recess indent are configured to positively retain the fastener driving tool adapter in the recess of the fastener 600 while a fastener driving tool (not shown) drills, drives and/or inserts the fastener 600 into a workpiece. As such, the head 610 retains the fastener driving tool adapter within the recess while the fastener 600 is moved axially forward and backward within the workpiece during drilling, driving and/or insertion of the fastener 600.

In this illustrated example, the shank 640 includes: (1) a plurality of thread formations 646 extending outwardly from the shank 640 to form a threaded shank that connects to the head 610 at the first end 642 of the shank 640; and (2) a breakaway line breakaway joint 660 disposed between the second end 644 of the shank 640 and the tip 670 of the fastener 400. In this illustrated example, the threaded shank (i.e., shank 640) connects to the head 610 at the first end 642 of the shank 640. In this illustrated example, the fastener 600 has the tip 670 at second end 644 of the shank 640, and the shank 640 has a longitudinal axis extending from the head 610 to the tip 670.

In this illustrated example, the drill tip of the tip 670 includes: (1) a first wing formation 674a extending radially from an outer surface of the tip 670; and (2) a second wing formation 674b extending radially from the outer surface of the tip 670. In this illustrated example, the first and second wing formations 674a and 674b define a wing formation diameter that is slightly larger than an outer diameter of the tip 670. In this illustrated example, the wing formation diameter of the first and second wing formations 674a and 674b is slightly larger than the major diameter of the thread formations 646 of the shank 640. As such, the tip 670 and the first and second wing formations 674a and 674b of the fastener 600 produce a hole in the workpiece that is slightly larger than the than the major diameter of the thread formations 646 of the shank 640. In this illustrated example, the tip 670 of the fastener 600 is configured as a breakaway drill tip, which is removed from the shank 640 of the fastener 600 once a hole is drilled through the workpiece. As such, the fastener 600 including the tip 670, drills a hole into the workpiece without having to use a separate drill bit to drill or otherwise form a hole through the workpiece. In this illustrated example, once the hole is drilled through the workpiece, the tip 670 including the first and second wing formations 674a and 674b is removed from the fastener 600 at the breakaway line or breakaway joint 660 such that a nut (not shown) is suitably installed around the thread formations 646 of the shank 640 and suitably tightened against the workpiece.

In one example embodiment, only the wings break away from the tip of the fastener. More specifically, the first and second wing formations are configured to break away or otherwise be removed from the tip of the fastener following the drilling of the hole in the workpiece. For example, the wings break off when a specialized nut is installed on the bolt and tightened against the deck post and deck beam. As such, the nut is configured to break off or otherwise remove the first and second wing formations as the nut is suitably installed on the fastener and suitably tightened against the workpiece. As such, in this example embodiment, the tip remains suitably connected to the fastener following the drilling, driving, and/or insertion of the fastener into the workpiece.

FIGS. 4, 13A, and 13B illustrate another example embodiment of the post-to-beam fastener of the present disclosure that is generally indicated by numeral 1100. This illustrated example embodiment shows selected components of the post-to-beam fastener 1100, and other components of the post-to-beam fastener 1100 not discussed herein will be readily understood by those skilled in the art.

The illustrated example post-to-beam fastener 1100, includes: (1) a head 1110; (2) a shank 1140 integrally connected to the head 1110 at a first end 1142 of the shank 1140; (3) a tip 1170 integrally connected to the shank 1140 at a second end 1144 of the shank 140; and (4) a drill bit 1180 removably attached to the tip 1170 of the fastener 1100. In this illustrated embodiment, the post-to-beam fastener 1100 is referred to as a "2 Piece Fastener Concept." that includes a ½ inch (1.27 cms) diameter bolt (i.e., fastener 1100) with a recess in an end (i.e., the tip 1170) of the bolt to removably attach the drill bit 1180. During operation, the drill bit 1180 is attached to the tip 1170 of the post-to-beam fastener 1100 and the user drills a hole through a workpiece (e.g., the deck post and the deck beam). After drilling is complete, the drill bit 1170 is removed from the fastener 1100. In this illustrated example, utilizing a drill bit produces efficient drilling and/or cutting action of the 2 Piece Fastener Concept. It should be appreciated that while the post-to-beam fastener 1100 is described as a ½ inch (1.27 cms) diameter bolt, any suitable different type of fastener and any suitable different size of fastener may be used in accordance with the present disclosure.

In various embodiments of the 2 Piece Fastener Concept, known drill bits are used. For example, in one such embodiment a drill bit with a hex shank can be received in a hex recess of the end of the fastener (e.g., a ¼ inch (0.635 cms) hex recess accommodating a ¼ inch (0.635 cms) hex shank spade bit). In another such embodiment, customized drill bits are created to optimize attachment to the recess in the end of the fastener. By utilizing drill bits, efficient cutting action can be achieved with the 2 Piece Fastener Concept.

In various embodiments, combining the predrilling and installation according to the present disclosure, the 2 Piece Fastener Concept provides a faster user experience. During operation, the 2 Piece Fastener Concept operation begins with connecting the bolt (i.e., fastener) to the drill driver. This can be done using a socket, star, or square drive adapter. Next, a drill bit is inserted into the recess on the tip end of the fastener. The recess at the end of the fastener enables the user to install various common drill bits. The drill bit is used to drill the fastener through the workpiece (e.g., the deck post and/or the deck beam). Once the cutting operation has been completed, the drill bit can be removed from the other side of the post (and used with subsequent 2 Piece Fastener Concept fasteners, or any other operation). A washer and nut are installed and tightened.

In this illustrated example, the head 1110 is configured with a hexagonal shape and includes a retaining feature. More specifically, the head 1110 includes surfaces that define: (1) a recess (not shown) defined in a top surface (not labeled) of the head 1110; and (2) a recess indent (not shown) defined in at least one sidewall (not shown) of the recess. In this illustrated example, the surface that define the recess are configured to engage with a fastener driving tool adapter (not shown) during drilling, driving and/or insertion of the fastener 1100 into a workpiece (e.g., the beam or the post) (not shown). In this illustrated example, the surfaces that define the recess indent are configured to positively retain the fastener driving tool adapter in the recess of the fastener 1100 while a driving tool (not shown) drives the fastener 1100 into a workpiece. As such, the head 1110 retains the fastener driving tool adapter within the recess while the fastener 1100 is moved axially forward and backward within the workpiece during driving and/or insertion of the fastener 100 into the workpiece.

In this illustrated example, the shank 1140 includes a plurality of thread formations 1146 extending outwardly from the shank 1140 to form a threaded shank that connects to the head 1110 at the first end 1142 of the shank 1140. In this illustrated example, the threaded shank (i.e., shank 1140) connects to the head 1110 at the first end 1142 of the shank 1140. In this illustrated example, the fastener 1100 forms the tip 1170 at second end 1144 of the shank 1140, and the shank 1140 has a longitudinal axis extending from the head 610 to the tip 670.

In this illustrated example, the tip 1170 of the fastener 1100 includes surfaces that define a recess 1176 in the tip 1170 to removably attach the drill bit 1180 to the fastener 1100. As best seen in FIGS. 13A and 13B, the recess 1176 is configured as a hex recess (e.g., a ¼ inch (0.635 cms) hex recess) that accepts any standard hex shank drill bits (e.g., ¼ inch (0.635 cms) hex shank drill bits) In this illustrated example embodiment, the recess 1176 does not provide any positive engagement of the drill bit 1180. That is, there is nothing securing (i.e., locking) the drill bit 1180 in place within the recess 1176, besides the force from the operator while drilling. As such, in this illustrated example, the drill bit 1180 is easily removed from the recess 1176 of the fastener 1100 after drilling and/or cutting a hole through a workpiece.

In another example embodiment, the recess of the fastener includes an additional positive retaining feature (not shown) (e.g., similar to the indent described in FIG. 12B with respect to the head 110 of the 1 Piece Fastener Concept fastener 100) to removably secure the drill bit in the end of the fastener. As such, the positive retaining feature secures the drill bit in place within the recess, along with the force from the operator while drilling.

FIGS. 16A and 16B illustrate another example embodiment of the post-to-beam fastener of the present disclosure that is generally indicated by numeral 1200. The post-to-beam fastener 1200 is similar to fastener 1100, discussed above. This illustrated example embodiment shows selected components of the post-to-beam fastener 1100, and other components of the post-to-beam fastener 1100 not discussed herein will be readily understood by those skilled in the art.

The illustrated example post-to-beam fastener 1200, includes: (1) a head 1210; (2) a shank 1240 integrally connected to the head 1210 at a first end 1242 of the shank 1240; (3) a tip 1270 integrally connected to the shank 1240 at a second end 1244 of the shank 1240; and (4) a drill bit 1280a removably attached to the tip 1270 of the fastener 1200. In this illustrated embodiment, the post-to-beam fastener 1200 is referred to as a "2 Piece Fastener Concept." that includes a ½ inch (1.27 cms) diameter bolt (i.e., fastener 1200) with a recess in an end (i.e., the tip 1270) of the fastener to removably attach the drill bit to the fastener. During operation, the drill bit 1280 is attached to the tip 1270 of the post-to-beam fastener 1200 and the user drills a hole through a workpiece (e.g., the deck post and the deck beam). After drilling is complete, the drill bit 1280a is removed from the fastener 1200. In this illustrated example, utilizing a drill bit produces efficient drilling and/or cutting action of the 2 Piece Fastener Concept fastener. It should be appreciated that while the post-to-beam fastener 1200 is described as a ½ inch (1.27 cms) diameter bolt, any suitable different type of fastener and any suitable different size of fastener may be used in accordance with the present disclosure.

In this illustrated example, the head 1210 is configured with a hexagonal shape and includes a retaining feature. More specifically, the head 1210 includes surfaces that define: (1) a recess (not shown) defined in a top surface (not labeled) of the head 1210; and (2) a recess indent (not shown) defined in at least one sidewall (not shown) of the recess. In this illustrated example, the surfaces that define the recess are configured to engage with a fastener driving tool adapter (not shown) during drilling, driving and/or insertion of the fastener 1200 into a workpiece (e.g., the beam or the post) (not shown). In this illustrated example, the surfaces that define the recess indent are configured to positively retain the fastener driving tool adapter in the recess of the fastener 1200 while a driving tool (not shown) drives the fastener 1200 into a workpiece. As such, the head 1210 retains the fastener driving tool adapter within the recess while the fastener 1200 is moved axially forward and backward within the workpiece during drilling, driving and/or insertion of the fastener 1200 into the workpiece.

In this illustrated example, the shank 1240 includes a plurality of thread formations 1246 extending outwardly from the shank 1240 to form a threaded shank that connects to the head 1210 at the first end 1242 of the shank 1240. In this illustrated example, the threaded shank (i.e., shank 1240) connects to the head 1210 at the first end 1242 of the shank 1240. In this illustrated example, the fastener 1200 forms the tip 1270 at second end 1244 of the shank 1240, and the shank 1240 has a longitudinal axis extending from the head 1210 to the tip 1270.

In this illustrated example, the tip 1270 of the fastener 1200 includes surfaces that define a threaded recess 1276 in the tip 1270 to removably attach to one of a plurality of different drill bits such as drill bits 1280a, 1280b, or 1280c. For example, as best seen in FIGS. 16A and 16B, the threaded recess 1276 includes an internal thread formation (not labeled) (e.g., a ¼-20 internal thread) extending from a surface of the threaded recess 1276 of the tip 1270 of the fastener 1200. In this example embodiment, the internal thread formation is configured to mate or otherwise accept a drill bit having a complimentary external thread formation (e.g., external ¼-20 threads). In this example embodiment, the threaded recess 1276 including the internal thread formation has an advantage in that the threads of the threaded recess 1276 positively engage the threads of the drill bit so it stays locked into place while drilling. Once the operation is finished, the drill bit is unscrewed and reused.

In various embodiments, users (such as contractors or deck builders) prefer carriage bolts that have a low-profile head compared to hex bolts or other such bolts. The low-profile head of carriage bolts may be perceived to look cleaner and more professional than hex bolts by homeowners (customers of the deck builders). Carriage bolts have no sharp edges that may interfere with homeowners using the deck.

Known carriage bolts have a square shoulder that locks the bolt into the wood when driven with a hammer. To attach a nut to the bolt at the end of the post-to-beam fastening process, the bolt must be rotatably held in place by the wood. In some instances, however, the square shoulder reams a hole in the wood, allowing the bolt to rotate freely. Then, the bolt cannot be rotatably held in place by the wood, thus removing the ability to fasten the connection with a nut.

FIGS. 17A to 17F illustrate another example embodiment of the post-to-beam fastener of the present disclosure that is generally indicated by numeral 1300. In this illustrated example embodiment, the post-to-beam fastener 1300 is a bolt (i.e., fastener 1300) for use in the 2 Piece Fastener Concept for post-to-beam fastening. More specifically, the fastener 1300 is a carriage bolt with a locking rib pattern replacing the square shoulder. The locking rib pattern, consisting of a plurality of ribs extending radially from the shank to the edge of the head, resists rotation and rotatably holds the fastener 1300 in place by engagement with the workpiece (e.g., the deck post and/or the deck beam). Each of the plurality of ribs is angled such that the fastener 1300 can spin freely in a clockwise direction but dig in when the fastener 1300 tries to rotate counterclockwise. Tightening a nut onto the fastener 1300 after drilling through the workpiece induces a counterclockwise rotation in the fastener, so if the ribs prevent this rotation, the fastener can be tightened fully.

The illustrated example post-to-beam fastener 1300 includes: (1) a head 1310; (2) a shank 1340 integrally connected to the head 1310 at a first end 1342 of the shank 1340; (3) a tip 1370 integrally connected to the shank 1340 at a second end 1344 of the shank 1340; and (4) a drill bit (not shown) removably attached to the tip 1370 of the fastener 1300.

In this illustrated example, the head 1310 is configured as a carriage bolt head and includes a retaining feature. More specifically, the head 1310 includes surfaces that define: (1) a recess 1312 defined in a top surface (not labeled) of the head 1310; and (2) a locking rib pattern 1316 including a plurality of ribs 1318 extending outwardly from a bottom surface (not labeled) of the head 1310. In this illustrated example, the surfaces that define the recess 1312 are configured to engage with a fastener driving tool adapter (not shown) during drilling, driving and/or insertion of the fastener 1300 into a workpiece (e.g., the beam or the post) (not shown). In this illustrated example, the plurality of ribs 1318 of the rib locking pattern 1316 engages with the workpiece such that the fastener 1300 does not freely spin when a nut (not shown) is suitably tightened around the fastener 1300.

It should be appreciated that while recess 1312 is shown as a star-shaped recess, other recesses may be used, such as a socket recess (engageable by a socket), and a square recess (engageable by a square drive adapter).

In this illustrated example, each rib 1318 of the locking rib pattern 1316 includes a leading face 1318a and a trailing face 1318b that meet at an apex 1318c of the rib 1318. The leading face 1318a forms an angle (not labeled) with respect to the bottom surface of the head 1310. Similarly, the trailing face 1318b forms an angle (not labeled) with respect to the bottom surface of the head 1310. In this illustrated example embodiment, the angle formed between the leading face 1318a and the bottom surface of the head 1310 is greater than the angle formed between the trailing face 1318b and the bottom surface of the head 1310. As such the leading face 1318a is at a sharper angle with respect to the workpiece (not shown), and the trailing face 1318b is at a shallower angle with respect to the workpiece.

In this illustrated example, the shank 1340 includes a plurality of thread formations 1346 extending outwardly from the shank 1340 to form a threaded shank that connects to the head 1310 at the first end 1342 of the shank 1340.

In this illustrated example, the thread formations 1346 of the shank 1340 are configured such that tightening a nut onto the fastener 1300 induces a counter-clockwise rotation of the fastener 1300, and loosening the nut from the fastener 1300 induces a clockwise rotation of the fastener 1300. As such, when the nut is tightened onto the thread formations 1346, the fastener 1300 is tightened against the workpiece, causing the locking rib pattern 1316 to come into contact with the workpiece. When the nut is loosened from the thread formations 1346, the fastener 1300 is loosened or backed away from the workpiece, causing the locking rib pattern 1316 to come out of contact with the workpiece.

In this illustrated example, as the nut is tightened onto the thread formations 1346, the tightening of the nut induces a counter-clockwise rotation of the fastener 1300, and the apex 1318c and leading edges 1318a of the ribs 1318 come into contact with the workpiece, Thus, the sharper angle of the leading edges 1318a contact the workpiece during the tightening process, creating a rotational resistance with respect to the workpiece by "biting" into the surface of the workpiece. As such, the interaction between the ribs 1318 and the workpiece prevent the fastener from spinning while the nut is being tightened. Conversely, when the nut is loosened from the thread formations 1346, the loosening of the nut induces a clockwise rotation of the fastener, and the apex 1318c and leading edges 1318a of the ribs 1318 come out of contact with the workpiece. Thus the shallower angle of the trailing edges 1318b reduce the rotational resistance with respect to the workpiece to allow the fastener 1300 to spin freely.

In this illustrated example, the tip 1370 of the fastener 1300 includes surfaces that define a recess 1376 in the tip 1370 to removably attach the drill bit (not shown) to the fastener 1300. In this illustrated example embodiment, the recess 1376 is configured as a hex recess (e.g., a ¼ inch (0.635 cms) hex recess) that accepts any standard hex shank drill bits (e.g., ¼ inch (0.635 cms) hex shank drill bits). In this illustrated example embodiment, the recess 1376 does not provide any positive engagement of the drill bit. That is, there is nothing securing (i.e., locking) the drill bit in place within the recess 1376, besides the force from the operator while drilling. As such, in this illustrated example, the drill bit is easily removed from the recess 1376 of the fastener 1300 after drilling and/or cutting a hole through a workpiece.

In this example embodiment, as illustrated in FIGS. 17A and 17E, a washer 1320 is integrated with the head 1310 of the fastener 1300. An integrated washer further reduces the number of pieces that users have to handle during installation (though some users may not presently use washers with known carriage bolts). The integrated washer also increases the bearing surface area of the head of the fastener. A larger bearing surface may provider a tighter post-to-beam connection, resulting in peace of mind for users and their customers. In this illustrated example embodiment, the head 1310 of the fastener 1300 has a diameter similar to a standard fender washer. Other diameters between a known carriage bolt and standard fender washer, or greater than the standard fender washer, are also possible.

FIGS. 18A, 18B, 18C, and 18D illustrate another example embodiment of the post-to-beam fastener of the present disclosure that is generally indicated by numeral 1400. The post-to-beam fastener 1400 is similar to fastener 1100, discussed above. This illustrated example embodiment shows selected components of the post-to-beam fastener 1400, and other components of the post-to-beam fastener 1400 not discussed herein will be readily understood by those skilled in the art.

The illustrated example post-to-beam fastener 1400, includes: (1) a head 1410; (2) a shank 1440 integrally connected to the head 1410 at a first end 1442 of the shank 1440; (3) a tip 1470 integrally connected to the shank 1440 at a second end 1444 of the shank 1440; and (4) a drill bit 1480 removably attached to the tip 1470 of the fastener 1400. In this illustrated embodiment, the post-to-beam fastener 1400 is referred to as a "2 Piece Fastener Concept." that includes a ½ inch (1.27 cms) diameter bolt (i.e., fastener 1200) with a recess in an end (i.e., the tip 1470) of the fastener to removably attach the drill bit to the fastener. During operation, the drill bit 1480 is attached to the tip 1470 of the post-to-beam fastener 1400 and the user drills a hole through a workpiece (e.g., the deck post and the deck beam). After drilling is complete, the drill bit 1480 is removed from the fastener 1400. In this illustrated example, utilizing a drill bit produces efficient drilling and/or cutting action of the 2 Piece Fastener Concept fastener. It should be appreciated that while the post-to-beam fastener 1400 is described as a ½ inch (1.27 cms) diameter bolt, any suitable different type of fastener and any suitable different size of fastener may be used in accordance with the present disclosure.

In this illustrated example, the head 1410 is configured with a hexagonal shape and includes a retaining feature. More specifically, the head 1410 includes surfaces that define: (1) a recess (not shown) defined in a top surface (not labeled) of the head 1410; (2) a recess indent (not shown) defined in at least one sidewall (not shown) of the recess; and (3) a washer 1420 is integrated with the head 1410 of the fastener 1400. In this illustrated example, the surfaces that define the recess are configured to engage with a fastener driving tool adapter (not shown) during drilling, driving and/or insertion of the fastener 1400 into a workpiece (e.g., the beam or the post) (not shown). In this illustrated example, the surfaces that define the recess indent are configured to positively retain the fastener driving tool adapter in the recess of the fastener 1400 while a driving tool (not shown) drives the fastener 1400 into a workpiece. As such, the head 1410 retains the fastener driving tool adapter within the recess while the fastener 1400 is moved axially forward and backward within the workpiece during drilling, driving and/or insertion of the fastener 1400 into the workpiece.

In this illustrated example, the tip 1470 includes: (1) a plurality of thread formations 1446 extending outwardly from at least a portion of the tip 1470; and (2) one or more v-grooves 1448 defined in and by the thread formations 1446. In this illustrated example, the shank (i.e., shank 1440) connects to the head 1410 at the first end 1442 of the shank 1440. In this illustrated example, the fastener 1400 forms the tip 1470 connected to the second end 1444 of the shank 1440, and the shank 1440 has a longitudinal axis extending from the head 1410 to the tip 1470. As clearly shown in FIGS. 18A, 18B, and 18C, in this illustrated example embodiment, the shank 1440 does not include any thread formations and that the tip 1470 includes the thread formations. In this illustrated example embodiment, as clearly shown in FIGS. 18A, 18B, and 18C, the shank 1440 is approximately three times longer than the tip 1470.

In this illustrated example, the one or more v-grooves 1448 defined in the thread formations 1446 extend along a portion of the thread formations 1446 (e.g., ¾ of an inch (1.905 cms) of the thread formations 1446). In this illustrated example, the one or more v-grooves 1448 cause a reduction of the friction generated by the cutting action of the thread formations 1446 into the workpiece during drilling, driving, and/or insertion of the fastener 1400 into the workpiece.

In this illustrated example, the tip 1470 of the fastener 1400 includes surfaces that define a recess 1476 in the tip 1470 to removably attach to the drill bit 1480. As best seen in FIGS. 18A and 18B, the recess 1476 is configured as a hex recess (e.g., a ¼ inch (0.635 cms) hex recess) that accepts any standard hex shank drill bits (e.g., ¼ inch (0.635 cms) hex shank drill bits). In this illustrated example embodiment, the recess 1476 does not provide any positive engagement of the drill bit 1480. That is, there is nothing securing the drill bit 1480 in place within the recess 1476, besides the force from the operator while drilling. As such, in this illustrated example, the drill bit 1480 is easily removed from the recess 1476 of the fastener 1400 after drilling and/or cutting a hole through a workpiece.

FIGS. 19A, 19B, 19C, 19D, and 19E illustrate various alternative further example embodiments of the post-to-beam fastener of the present disclosure that are generally indicated by numeral 1500. The post-to-beam fastener 1500 shown in FIGS. 19A, 19B, 19C, and 19D is similar to fastener 1100, discussed above. This illustrated example embodiment shows selected components of the post-to-beam fastener 1500, and other components of the post-to-beam fastener 1500 not discussed herein will be readily understood by those skilled in the art.

The illustrated example post-to-beam fastener 1500 includes: (1) a head 1510; (2) a shank 1540 integrally connected to the head 1510 at a first end 1542 of the shank 1540; (3) a tip 1570 integrally connected to the shank 1540 at a second end 1544 of the shank 1540; and (4) a drill bit (not shown) removably attached to the tip 1570 of the fastener 1500.

In this illustrated example, the head 1510 is configured with a hexagonal shape and includes: (1) a washer 1520 integrated with the head 1510 of the fastener 1500; and (2) a locking rib pattern 1516 including a plurality of ribs 1518 extending outwardly from a bottom surface (not labeled) of the washer 1520 integrated with the head 1510.

In one example, the washer 1520 is configured as a standard washer having a diameter of substantially 1.06 inches (2.6924 cms). In another example, the washer (not shown) is configured as a larger fender-type washer having a diameter of substantially 1.375 inches (3.4925 cms). It should be appreciated that while two washers having different dimensions are discussed, other suitable integrated washers having other suitable dimensions may be used in accordance with the present disclosure.

In this illustrated example, each rib 1518 of the locking rib pattern 1516 includes a leading face 1518a and a trailing face 1518b that meet at an apex 1518c of the rib 1518. The leading face 1518a forms an angle (not labeled) with respect to the bottom surface of the washer 1520 integrated with the head 1510. Similarly, the trailing face 1518b forms an angle (not labeled) with respect to the bottom surface of the washer 1520 integrated with the head 1510. In this illustrated example embodiment, the angle formed between the leading face 1518a and the bottom surface of the washer 1520 is greater than the angle formed between the trailing face 1518b and the bottom surface of the washer 1520. As such the leading face 1518a is at a sharper angle with respect to the workpiece (not shown), and the trailing face 1518b is at a shallower angle with respect to the workpiece.

In one illustrated example, best seen in FIGS. 19B and 19D, the plurality of ribs 1518 of rib pattern 1516 include partial ribs configured to radially extend from a location along the outer circumference of the washer 1520 to an interior location spaced a specified distance from the shank 1540. As such, the ribs 1516 radially extend along the surface of the washer 1520 a partial distance between the outer circumference of the washer and the shank 1540.

In this illustrated example, the shank 1540 includes: (1) a plurality of thread formations 1546 extending outwardly from at least a portion of the shank 1540 to form a threaded shank that connects to the head 1510 at the first end 1542 of the shank 1540; and (2) one or more v-grooves 1548 defined in the thread formations 1546. In this illustrated example, the threaded shank (i.e., shank 1540) connects to the head 1510 at the first end 1542 of the shank 1540. In this illustrated example, the fastener 1500 forms the tip 1570 at second end 1544 of the shank 1540, and the shank 1540 has a longitudinal axis extending from the head 1510 to the tip 1570.

In this illustrated example, the one or more v-grooves 1548 defined in the thread formations 1546 extend along a portion of the thread formations 1546 (e.g., ¾ of an inch of the thread formations 1546). In this illustrated example, the one or more v-grooves 1548 cause a reduction of the friction generated by the cutting action of the thread formations 1546 into the workpiece during drilling, driving, and/or insertion of the fastener 1500 into the workpiece.

In this illustrated example, the tip 1570 of the fastener 1500 includes surfaces that define a recess 1576 in the tip 1570 to removably attach to a drill bit (not shown). As best seen in FIG. 19B, the recess 1576 is configured as a hex recess (e.g., a ¼ inch (0.635 cms) hex recess) that accepts any standard hex shank drill bits (e.g., ¼ inch (0.635 cms) hex shank drill bits). In this illustrated example embodiment, the recess 1576 does not provide any positive engagement of the drill bit. That is, there is nothing securing the drill bit in place within the recess 1576, besides the force from the operator while drilling. As such, in this illustrated example, the drill bit is easily removed from the recess 1576 of the fastener 1500 after drilling and/or cutting a hole through a workpiece.

In another illustrated example, best seen in FIG. 19E, the fastener 1600 includes a plurality of ribs 1618 of rib pattern 1616 that include full ribs configured to radially extend from a location along the outer circumference of the washer 1620 to an interior location adjacent to the shank 1640. As such, the ribs 1618 radially extend along the surface of the washer 1620 the entire distance between the outer circumference of the washer 1620 and the shank 1640.

In various embodiments, of the 1 Piece Fastener Concept, several variations of the feature (e.g., the recess in the head) to positively retain the bolt to be moved forward and backward axially are possible. As the drill tip drives into the wood workpiece, small wood chips are created within the hole. For the drill to operate efficiently, these chips should be cleared to allow for more chips to be created. If these chips are not cleared the drill tip will get clogged with chips, thus impeding advancement of the drill tip and heating the drill tip due to excessive friction. A positive engagement head clears the wood chips by allowing the bolt to be pulled back and forth out of the hole.

In one such embodiment, FIGS. 12A and 12B illustrate a ¼ inch (0.635 cms) Hex to ¼ inch (0.635 cms) Square Adapter. This adapter includes a ball detent which locks into the indent (or hole) defined surfaces of the square recess defined in surfaces of the head of the bolt. As such, the positive engagement provided by the ¼ inch (0.635 cm) Hex to ¼ inch (0.635 cms) Square Adapter enables the bolt to be pulled back and forth out of the hole to clear the wood chips generated while drilling the hole.

In another such embodiment, FIGS. 13, 14A, and 14B illustrate an integrated driving tool adapter integrated with the head of the bolt allowing for direct attachment of the integrated driving tool adapter to the drill chuck. This direct attachment is a form of positive engagement, as the drill chuck locks into the integrated driving tool adapter. As such, the positive engagement provided by the integrated driving tool adapter enables the bolt to be pulled back and forth out of the hole to clear the wood chips generated while drilling the hole.

In various embodiments of the 2 Piece Fastener Concept, the recess at the end of the bolt enables the user to install various common drill bits for use in the post-to-beam fastener installation methods of the present disclosure. The drill bit is inserted into the end of the bolt and used to drill the bolt through the post. Once the cutting operation has been completed, the drill bit can be removed (and used with subsequent 2 Piece Concept bolts, or any other operation).

FIG. 5 illustrates a comparison between methods of post-to-beam fastening using known methods (the "Current Solution"), the 1 Piece Fastener Concept of the present disclosure, and the 2 Piece Fastener Concept of the present disclosure. The known method begins with a drill bit attached to the drill driver. A ½ inch hole is pre-drilled through the post, and a ½ inch (1.27 cms) through bolt is hammered into the hole. A washer and nut are attached and tightened.

By combining the predrilling and installation according to the present disclosure, the 1 Piece Fastener Concept and the 2 Piece Fastener Concept provide a faster user experience. The 1 Piece Fastener Concept operation begins with positively retaining the bolt (i.e., at the square recess with hole in the head) to the drill driver. Next, the bolt is drilled and driven through the wood using the peck-drilling technique described above. Once the bolt is driven all the way through the post, the drill driver is removed from the head of the bolt. A washer and nut are assembled on the end of the bolt, and the entire assembly is fastened tightly together.

The 2 Piece Fastener Concept operation begins with connecting the bolt to the drill driver. This can be done using a socket, star, or square drive adapter. Next, a 6 inch (15.24 cms) long drill bit is inserted into the recess on the tip end of the bolt. The bolt is drilled and driven into the post in one motion without the peck-drilling used by the 1 Piece Concept operation. The drill bit is then removed from the other side of the post, and a washer and nut are installed and tightened.

Thus, the several aforementioned objects and advantages are most effectively attained. The 1 Piece Fastener Concept and 2 Piece Fastener Concept of the present disclosure combine pre-drilling and bolt installation steps of post-to-beam fastening into one step. Use of the bolts and methods of the present disclosure result in faster and more efficient installations of deck posts and deck beams.

Various changes and modifications to the present embodiments described herein will be apparent to those skilled in the art. Such changes and modifications can be made without departing from the spirit and scope of the present subject matter and without diminishing its intended advantages. It is therefore intended that such changes and modifications be covered by the appended claims.

The invention claimed is:

1. A fastener assembly comprising:
a drill bit including a hexagonal shaped first end and an opposite second end having a tip; and
a fastener including:
a head;
a threaded shank section including exterior threaded formations and interior surfaces defining a hexagonal shaped recess configured to removably receive the hexagonal shaped first end of the drill bit, wherein the interior surfaces are configured to engage the hexagonal shaped first end of the drill bit, wherein the interior surfaces enable the hexagonal shaped first end of the drill bit to be removed from the hexagonal shaped recess; and
a non-threaded shank section connected to the head at a first end and to the threaded shank section at a second end, the non-threaded shank section having a longitudinal axis extending from the head to the threaded shank section, the non-threaded shank section including a first portion closest to the head that does not include any thread formations and a second portion closest to the threaded shank section that does not include any thread formations, wherein the first portion of the non-threaded shank section and the second portion of the non-threaded shank section are approximately three times longer than the threaded shank section,
wherein the drill bit has a length that is longer than the non-threaded shank section and that is longer than the threaded shank section,
wherein the head, the threaded shank section, and the non-threaded shank section are integrally formed.

2. The fastener assembly of claim 1, wherein the head has a hexagonal shape.

3. The fastener assembly of claim 1, wherein the head defines a recess.

4. The fastener assembly of claim 1, which includes a washer integrally connected to a bottom portion of the head.

5. The fastener assembly of claim 1, which includes a washer positionable adjacent to a bottom portion of the head.

6. The fastener assembly of claim 1, which includes locking ribs under the head.

7. The fastener assembly of claim 6, wherein each of the locking ribs extends radially outwardly.

8. The fastener assembly of claim 1, wherein the length of the drill bit is approximately as long as the non-threaded shank section and the threaded shank section combined.

* * * * *